(12) United States Patent
Chopra et al.

(10) Patent No.: US 8,581,000 B2
(45) Date of Patent: Nov. 12, 2013

(54) PROCESS FOR PREPARING AMIDE GELLANT COMPOUNDS WITH AROMATIC END GROUPS

(75) Inventors: Naveen Chopra, Oakville (CA);
Thomas E Enright, Tottenham (CA);
Michelle N Chrétien, Mississauga (CA);
Barkev Keoshkerian, Thornhill (CA);
Daryl W Vanbesien, Burlington (CA)

(73) Assignee: Xerox Corporation, Norwalk, CT (US)

( * ) Notice: Subject to any disclaimer, the term of this patent is extended or adjusted under 35 U.S.C. 154(b) by 130 days.

(21) Appl. No.: 13/154,404

(22) Filed: Jun. 6, 2011

(65) Prior Publication Data

US 2012/0309924 A1 Dec. 6, 2012

(51) Int. Cl.
*C07C 67/02* (2006.01)

(52) U.S. Cl.
USPC ............ 560/254; 528/310; 564/130; 564/169

(58) Field of Classification Search
USPC ........................... 528/310; 560/130, 169, 254
See application file for complete search history.

(56) References Cited

U.S. PATENT DOCUMENTS

| | | | |
|---|---|---|---|
| 4,565,849 A * | 1/1986 | Horikawa et al. ............. | 525/420 |
| 4,830,671 A | 5/1989 | Frihart et al. | |
| 5,783,657 A | 7/1998 | Pavlin et al. | |
| 6,111,055 A | 8/2000 | Berger et al. | |
| 7,259,275 B2 | 8/2007 | Belelie et al. | |
| 2010/0323102 A1 * | 12/2010 | Chopra et al. ............. | 427/125 |
| 2011/0262643 A1 | 10/2011 | Chopra et al. | |
| 2011/0262711 A1 | 10/2011 | Chopra et al. | |
| 2011/0263769 A1 | 10/2011 | Chopra et al. | |
| 2011/0263890 A1 * | 10/2011 | Chopra et al. ............. | 560/145 |

OTHER PUBLICATIONS

U.S. Appl. No. 12/765,138, filed Apr. 22, 2010, Chopra et al.
U.S. Appl. No. 12/765,148, filed Apr. 22, 2010, Chopra et al.

* cited by examiner

*Primary Examiner* — Gregory Listvoyb
(74) *Attorney, Agent, or Firm* — Judith L. Byorick

(57) ABSTRACT

Disclosed is a process for preparing a compound of the formula

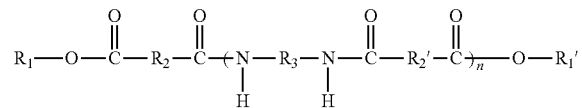

wherein $R_1$ and $R_1'$, $R_2$ and $R_2'$, and $R_3$ are as defined herein, said process comprising (I) reacting a diacid of the formula HOOC—$R_2$—COOH with a diamine of the formula $H_2$N—$R_3$—$NH_2$ to form an acid-terminated oligoamide intermediate of the formula HOOC—$R_2$—CONH—$R_3$—HNCO—$R_2'$—COOH; and (II) reacting the acid-terminated oligoamide intermediate with a monoalcohol of the formula $R_1$—OH in the presence of a tin or organic titanate catalyst, in the absence of a coupling agent, and in the absence of a solvent to form the product. Also disclosed is a composition prepared by the process.

20 Claims, No Drawings

PROCESS FOR PREPARING AMIDE GELLANT COMPOUNDS WITH AROMATIC END GROUPS

CROSS-REFERENCE TO RELATED APPLICATIONS

Reference is made to U.S. application Ser. No. 12/765,138, filed Apr. 22, 2010, entitled "Phase Change Inks Containing Amide Gellant Compounds with Aromatic End Groups," with the named inventors Naveen Chopra, Michelle N. Chrétien, Barkev Keoshkerian, Jennifer L. Belelie, and Peter G. Odell, the disclosure of which is totally incorporated herein by reference.

Reference is made to U.S. application Ser. No. 12/765,148, filed Apr. 22, 2010, entitled "Amide Gellant Compounds with Aromatic End Groups," with the named inventors Naveen Chopra, Michelle N. Chrétien, Barkev Keoshkerian, Jennifer L. Belelie, and Peter G. Odell, the disclosure of which is totally incorporated herein by reference.

BACKGROUND

Disclosed herein is a process for preparing diamide compounds having aromatic ester end groups. More specifically, disclosed herein is a process for preparing these compounds by a two-step process in the absence of a solvent in the second step using an organotin catalyst.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

The use of amide gellants in phase change inks is known, as disclosed in, for example, U.S. Pat. Nos. 7,714,040 and 7,625,956, the disclosures of each of which are totally incorporated herein by reference. Methods of making these materials are also known, as disclosed in, for example, U.S. Pat. Nos. 7,271,284 and 7,259,275, the disclosures of each of which are totally incorporated herein by reference. These amide gellants, when incorporated into radiation-curable phase change inks, enable advantages such as excellent adhesion to a wide variety of substrates and enhanced pigment dispersion stability.

While known compositions and processes are suitable for their intended purposes, a need remains for improved phase change ink compositions. In addition, a need remains for phase change inks that produce images with improved scratch resistance. Further, a need remains for phase change inks that produce images with improved adhesion to substrates such as paper. Additionally, a need remains for ultraviolet-curable compounds that can be incorporated into phase change ink carriers without adversely affecting the viscosity characteristics of the ink at desired jetting temperatures. There is also a need for ultraviolet-curable compounds that can be incorporated into phase change ink carriers without adversely affecting the melting point of the ink. In addition, there is a need for ultraviolet-curable phase change inks that can be used in ink jet printing processes wherein the ink is jetted directly onto a final substrate such as paper or transparency material. Further, there is a need for phase change inks that generate images which exhibit improved robustness on the final recording sheet. Additionally, there is a need for phase change inks that generate images with improved toughness. A need also remains for phase change inks that can be jetted at reduced temperatures. In addition, a need remains for phase change inks that enable control of dot spread of the ink, particularly in processes wherein the ink is jetted directly onto a final substrate. Further, there is a need for phase change inks wherein the ink does not bleed excessively into the substrate, particularly in processes wherein the ink is jetted directly onto a final substrate. Additionally, there is a need for phase change inks wherein the ink does not generate an undesirably high pile height and wherein an unnecessarily high number of drops are needed to create the image, particularly in processes wherein the ink is jetted directly onto a final substrate. A need also remains for phase change inks wherein the ink generates images with reduced showthrough. In addition, a need remains for phase change inks wherein the increased viscosity of the ink during photoinitiation reduces the rate of diffusion of oxygen and its inhibitory effect in the ink, thereby increasing the efficiency of cure. Further, a need remains for improved ultraviolet curable phase change ink compositions used in production printing. Additionally, a need remains for an improved phase change ink composition providing wide substrate latitude, excellent adhesion, and enhanced pigment dispersion stability. There is also a need for gellant compositions for phase change inks that can provide enhanced spectral transmission and gelation properties. In addition, there is a need for a gellant composition for phase change inks that can be readily produced and that does not require post reaction purification to achieve the desired gellant composition. Further, there is a need for a gellant that can provide adequate gelation strength without the need for complex processing steps. Additionally, there is a need for a gellant that has high thermal stability.

A need further remains for improved methods of preparing such gellants. Common methods for preparing these materials use a solvent-based esterification step using a Steiglich condensation reaction. The reagents used in this reaction include, for example, N,N-dicyclohexylcarbodiimide and N,N-dimethylaminopyridine. This process is solvent intensive and wasteful in that reactants such as the dicyclohexylcarbodiimide coupling reagent are expensive and generate significant solid urea waste byproduct. There exists a need for a 'greener', lower cost, faster and less wasteful process for making amide gellant molecules. There also exists a need for a method for making amide gellant molecules that enables a product with controlled polydispersity.

SUMMARY

Disclosed herein is a process for preparing a compound of the formula

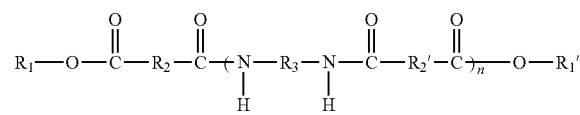

wherein: (a) $R_1$ and $R_1'$ can be either the same as each other or different from each other, wherein $R_1$ and $R_1'$ are: (i) alkyl groups, including substituted and unsubstituted alkyl groups, wherein hetero atoms may optionally be present in the alkyl group; (ii) aryl groups, including substituted and unsubstituted aryl groups, wherein hetero atoms may optionally be present in the aryl group; (iii) arylalkyl groups, including substituted and unsubstituted arylalkyl groups, wherein hetero atoms may optionally be present in either the aryl or the alkyl of the arylalkyl group; or (iv) alkylaryl groups, including substituted and unsubstituted alkylaryl groups, wherein hetero atoms may optionally be present in either the aryl or the alkyl portion of the alkylaryl group; provided that: (A) at least one of $R_1$ and $R_1'$ contains an aromatic group; and (B) neither of $R_1$ and $R_1'$ contains a photoinitiator group; (b) $R_2$ and $R_2'$ can be either the same as each other or different from each other, wherein $R_2$ and $R_2'$ are each, independently of the other, are: (i) alkylene groups, including substituted and unsubstituted alkylene groups, and wherein hetero atoms may optionally be present in the alkylene group; (ii) arylene groups, including substituted and unsubstituted arylene groups, and wherein hetero atoms may optionally be present in the arylene group; (iii) arylalkylene groups, including substituted and unsubstituted arylalkylene groups, wherein hetero atoms may optionally be present in either the aryl or the alkyl portion of the arylalkylene group; or (iv) alkylarylene groups, including substituted or unsubstituted alkylarylene groups, wherein hetero atoms may optionally be present in either the aryl or the alkyl portion of the alkylarylene group; (c) $R_3$ is: (i) an alkylene group, substituted and unsubstituted alkylene groups, wherein hetero atoms may optionally be present in the alkylene group; (ii) an arylene group, including substituted and unsubstituted arylene groups, wherein hetero atoms may optionally be present in the arylene group; (iii) an arylalkylene group, including substituted or unsubstituted arylalkylene groups, wherein hetero atoms may optionally be present in either the aryl or the alkyl portion of the arylalkylene group; or (iv) an alkylarylene group, including substituted and unsubstituted alkylarylene groups, wherein hetero atoms may optionally be present in either the aryl or the alkyl portion of the alkylarylene group; and (d) n represents the number of repeat monomer units; said process comprising: (I) reacting a diacid of the formula HOOC—$R_2$—COOH with a diamine of the formula $H_2N$—$R_3$—$NH_2$ to form an acid-terminated oligoamide intermediate of the formula HOOC—$R_2$—CONH—$R_3$—HNCO—$R_2'$—COOH; and (II) reacting the acid-terminated oligoamide intermediate with a monoalcohol of the formula $R_1$—OH (a) in the presence of a catalyst which is either (i) a tin catalyst, or (ii) an organic titanate catalyst, (b) in the absence of a coupling agent, and (c) in the absence of a solvent to form the product. Also disclosed is a process for preparing a compound of the formula

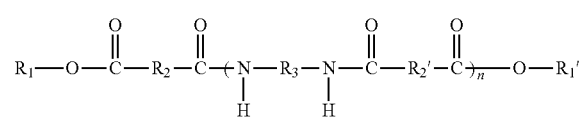

wherein: (a) $R_1$ and $R_1'$ can be either the same as each other or different from each other, wherein $R_1$ is:

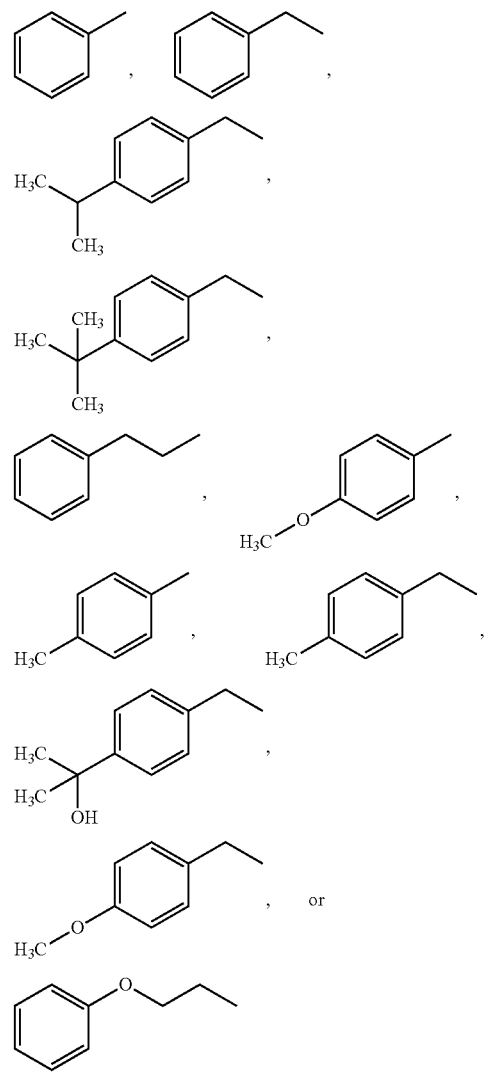

and $R_1'$ is either the same as $R_1$ or is:

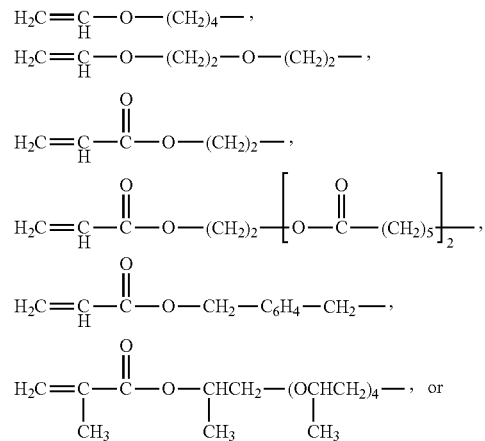

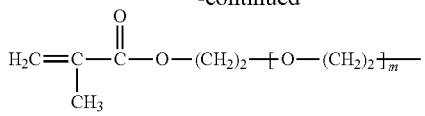

wherein m is an integer representing the number of repeating —O—(CH$_2$)$_2$— units; (b) R$_2$ and R$_2$' are the same as each other and are each branched alkylene groups of the formula —C$_{34}$H$_{56+a}$—, which may include unsaturations and cyclic groups, wherein a is an integer of 0, 1, 2, 3, 4, 5, 6, 7, 8, 9, 10, 11, or 12; (c) R$_3$ is —CH$_2$CH$_2$—; and (d) n represents the number of repeat monomer units and is from 1 to about 5; said process comprising: (I) reacting a diacid of the formula HOOC—R$_2$—COOH with a diamine of the formula H$_2$N—R$_3$—NH$_2$ in the absence of a solvent to form an acid-terminated oligoamide intermediate of the formula HOOC—R$_2$—CONH—R$_3$—HNCO—R$_2$'—COOH; and (II) reacting the acid-terminated oligoamide intermediate with a monoalcohol of the formula R$_1$—OH (a) in the presence of a tin or organic titanate catalyst which is dibutyl tin oxide, butylstannoic acid, butyltin tris-2-ethylhexoate, dibutyltin diacetate, dibutyltin dilaurate, dibutyltin bis(2-ethylhexoate), dibutyldichlorostannane, butyltrichlorostannane, dibutyltin dimethoxide, dibutyltin dibutoxide, dibutyltin bis(1-thioglycerol), monobutyltin trichloride, monobutyltin tris(2-ethylhexyl mercaptoacetate), dibutyltin bis(2-ethylhexyl mercaptoacetate), triphenyltin hydroxide, dioctyltin bis(2-ethylhexylmercaptoacetate), stannous bis(2-ethylhexoate), tin oxide, stannous oxalate, stannous chloride, tin tetrachloride, butylchlorotin dihydroxide, tetra-n-butyl titanate, tetra isopropyl titanate, tetra-n-propyl titanate, tetra-2-ethylhexyl titanate, triethanolamine titanate, tetra isononyl titanate, or a mixture thereof, (b) in the absence of a coupling agent, (c) in the absence of any catalysts other than the tin or organic titanate catalyst, and (d) in the absence of a solvent to form the product. Further disclosed is a composition which comprises: (I) a compound of the formula

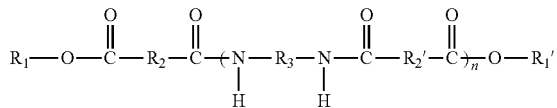

wherein: (a) R$_1$ and R$_1$' can be either the same as each other or different from each other, wherein R$_1$ and R$_1$' are: (i) alkyl groups, including substituted and unsubstituted alkyl groups, wherein hetero atoms may optionally be present in the alkyl group; (ii) aryl groups, including substituted and unsubstituted aryl groups, wherein hetero atoms may optionally be present in the aryl group; (iii) arylalkyl groups, including substituted and unsubstituted arylalkyl groups, wherein hetero atoms may optionally be present in either the aryl or the alkyl of the arylalkyl group; or (iv) alkylaryl groups, including substituted and unsubstituted alkylaryl groups, wherein hetero atoms may optionally be present in either the aryl or the alkyl portion of the alkylaryl group; provided that: (A) at least one of R$_1$ and R$_1$' contains an aromatic group; and (B) neither of R$_1$ and R$_1$' contains a photoinitiator group; (b) R$_2$ and R$_2$' can be either the same as each other or different from each other, wherein R$_2$ and R$_2$' are each, independently of the other, are: (i) alkylene groups, including substituted and unsubstituted alkylene groups, and wherein hetero atoms may optionally be present in the alkylene group; (ii) arylene groups, including substituted and unsubstituted arylene groups, and wherein hetero atoms may optionally be present in the arylene group; (iii) arylalkylene groups, including substituted and unsubstituted arylalkylene groups, wherein hetero atoms may optionally be present in either the aryl or the alkyl portion of the arylalkylene group; or (iv) alkylarylene groups, including substituted or unsubstituted alkylarylene groups, wherein hetero atoms may optionally be present in either the aryl or the alkyl portion of the alkylarylene group; (c) R$_3$ is: (i) an alkylene group, substituted and unsubstituted alkylene groups, wherein hetero atoms may optionally be present in the alkylene group; (ii) an arylene group, including substituted and unsubstituted arylene groups, wherein hetero atoms may optionally be present in the arylene group; (iii) an arylalkylene group, including substituted or unsubstituted arylalkylene groups, wherein hetero atoms may optionally be present in either the aryl or the alkyl portion of the arylalkylene group; or (iv) an alkylarylene group, including substituted and unsubstituted alkylarylene groups, wherein hetero atoms may optionally be present in either the aryl or the alkyl portion of the alkylarylene group; and (d) n represents the number of repeat monomer units; and (II) a tin or organic titanate compound present in an amount of from about 0.01 to about 0.5 percent by weight.

DETAILED DESCRIPTION

Disclosed herein is a method for preparing compounds of the formula

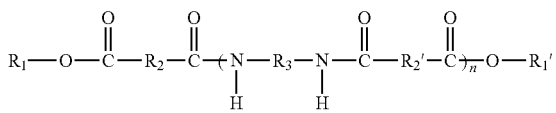

wherein:
n represents the number of repeat monomer units, and is in one embodiment from 1 to about 10 and in another embodiment from 1 to about 5, although the value of n can be outside of these ranges;
R$_1$ and R$_1$' can be either the same as each other or different from each other, wherein R$_1$ and R$_1$' are (i) alkyl groups (including linear and branched, saturated or unsaturated, cyclic and acyclic, and substituted and unsubstituted alkyl groups, wherein hetero atoms, such as oxygen, nitrogen, sulfur, silicon, phosphorus, boron, and the like, may optionally be present in the alkyl group, in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges; and in one specific embodiment being alkyl groups having a least one ethylenic unsaturation therein; (ii) aryl groups (including substituted and unsubstituted aryl groups, wherein hetero atoms, such as oxygen, nitrogen, sulfur, silicon, phosphorus, boron, and the like, may optionally be present in the aryl group, in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like; (iii) arylalkyl groups (including substituted and unsubstituted arylalkyl groups, wherein the alkyl portion of the arylalkyl group can be linear or branched, saturated or unsaturated, cyclic or acyclic, and substituted or unsubstituted, and wherein hetero atoms, such as oxygen, nitrogen, sulfur, silicon, phosphorus, boron, and the like, may optionally be present in either the aryl or the alkyl of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like; and in one specific embodiment being arylalkyl groups having at least one ethylenic unsaturation therein; or (iv) alkylaryl groups (including substituted and unsubstituted alkylaryl groups, wherein the alkyl portion of the alkylaryl group can be linear or branched, saturated or unsaturated, cyclic or acyclic, and substituted or unsubstituted, and wherein hetero atoms, such as oxygen, nitrogen, sulfur, silicon, phosphorus, boron, and the like, may optionally be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like; and in one specific embodiment being alkylaryl groups having at least one ethylenic unsaturation therein; wherein the substituents on the substituted alkyl, aryl, arylalkyl, and alkylaryl, groups of $R_1$ and $R_1'$ can be, but are not limited to, halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring; provided that at least one of $R_1$ and $R_1'$ contains an aromatic group and provided that neither of $R_1$ and $R_1'$ contains a photoinitiator group;

$R_2$ and $R_2'$ can be either the same as each other or different from each other, wherein $R_2$ and $R_2'$ are each, independently of the other, are (i) alkylene groups (including linear and branched, saturated and unsaturated, cyclic and acyclic, and substituted and unsubstituted alkylene groups, and wherein hetero atoms, such as oxygen, nitrogen, sulfur, silicon, phosphorus, boron, and the like, may optionally be present in the alkylene group), in one embodiment with at least about 2 carbon atoms, in another embodiment with at least about 4 carbon atoms, and in yet another embodiment with at least 6 carbon atoms, and in one embodiment with no more than about 100 carbon atoms, in another embodiment with no more than about 60 carbon atoms, and in yet another embodiment with no more than about 50 carbon atoms, and in various embodiments with 8, 10, 12, 14, 16, 18, 20, 22, 24, 26, 28, 30, 32, 34, or 36 carbon atoms, although the number of carbon atoms can be outside of these ranges; (ii) arylene groups (including substituted and unsubstituted arylene groups, and wherein hetero atoms, such as oxygen, nitrogen, sulfur, silicon, phosphorus, boron, and the like, may optionally be present in the arylene group), such as phenylene or the like, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges; (iii) arylalkylene groups (including substituted and unsubstituted arylalkylene groups, wherein the alkyl portion of the arylalkylene group can be linear or branched, saturated or unsaturated, cyclic or acyclic, and substituted or unsubstituted, and wherein hetero atoms, such as oxygen, nitrogen, sulfur, silicon, phosphorus, boron, and the like, may optionally be present in either the aryl or the alkyl portion of the arylalkylene group), such as benzylene or the like, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges; or (iv) alkylarylene groups (including substituted and unsubstituted alkylarylene groups, wherein the alkyl portion of the alkylarylene group can be linear or branched, saturated or unsaturated, cyclic or acyclic, and substituted or unsubstituted, and wherein hetero atoms, such as oxygen, nitrogen, sulfur, silicon, phosphorus, boron, and the like, may optionally be present in either the aryl or the alkyl portion of the alkylarylene group), such as tolylene or the like, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 50 carbon atoms, although the number of carbon atoms can be outside of these ranges; wherein the substituents on the substituted alkylene, arylene, arylalkylene, and alkylarylene groups of $R_2$ and $R_2'$ can be, but are not limited to, pyridine groups, pyridinium groups, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, thiocyanato groups, carboxylate groups, urethane groups, urea groups, mixtures thereof, and the like, wherein two or more substituents can be joined together to form a ring;

$R_3$ is (i) an alkylene group (including linear and branched, saturated and unsaturated, cyclic and acyclic, and substituted and unsubstituted alkylene groups, and wherein hetero atoms, such as oxygen, nitrogen, sulfur, silicon, phosphorus, boron, and the like, may optionally be present in the alkylene group), in one embodiment with at least about 2 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside of these ranges; (ii) an arylene group (including substituted and unsubstituted arylene groups, and wherein hetero atoms, such as oxygen, nitrogen, sulfur, silicon, phosphorus, boron, and the like, may optionally be present in the arylene group), in one embodiment with at least about 5 carbon atoms, and in another embodiment with at least about 6 carbon atoms, and in one embodiment with no more than about 50 carbon atoms, in another embodiment with no more than about 25 carbon atoms, and in yet another embodiment with no more than about 18 carbon atoms, although the number of carbon atoms can be outside of these ranges, such as phenylene and the like; (iii) an arylalkylene group (including substituted and unsubstituted arylalkylene groups, wherein the alkyl portion of the arylalkylene group can be linear or branched, saturated or unsaturated, cyclic or acyclic, and substituted or unsubstituted, and wherein hetero atoms, such as oxygen, nitrogen, sulfur, silicon, phosphorus, boron, and the like, may optionally be present in either the aryl or the alkyl portion of the arylalkylene group), in one embodiment with at least about 6 carbon atoms, and in another embodiment with at least about 7 carbon atoms, and in one embodiment with no more than about 50 carbon atoms, in another embodiment with no more than about 36 carbon atoms, and in yet another embodiment with no more than about 18 carbon atoms, although the number of carbon atoms can be outside of these ranges, such as benzylene or the like; or (iv) an alkylarylene group (including substituted and unsubstituted alkylarylene groups, wherein the alkyl portion of the alkylarylene group can be linear or branched, saturated or unsaturated, cyclic or acyclic, and substituted or unsubstituted, and wherein hetero atoms, such as oxygen, nitrogen, sulfur, silicon, phosphorus, boron, and the like, may optionally be present in either the aryl or the alkyl portion of the alkylarylene group), in one embodiment with at least about 6 carbon atoms, and in another embodiment with at least about 7 carbon atoms, and in one embodiment with no more than about 50 carbon atoms, in another embodiment with no more than about 36 carbon atoms, and in yet another embodiment with no more than about 18 carbon atoms, although the number of carbon atoms can be outside of these ranges, such as tolylene or the like, wherein the substituents on the substituted alkylene, arylene, arylalkylene, and alkylarylene $R_3$ groups can be, but are not limited to, pyridine groups, pyridinium groups, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, carboxylate groups, urethane groups, urea groups, mixtures thereof, and the like, wherein two or more substituents can be joined together to form a ring.

In specific embodiments, $R_1$ and $R_1'$ are the same and are selected from aromatic groups such as

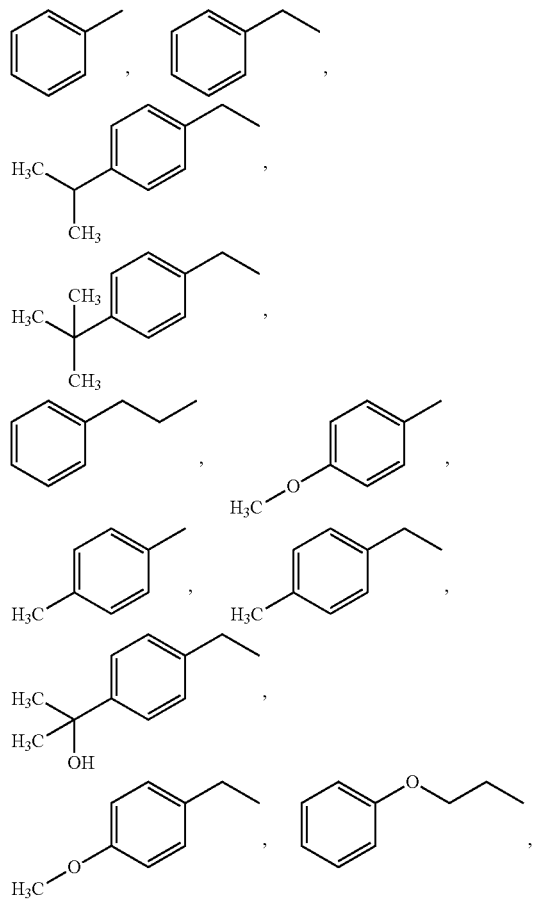

or the like.

In other specific embodiments, one of $R_1$ and $R_1'$ is of the formula

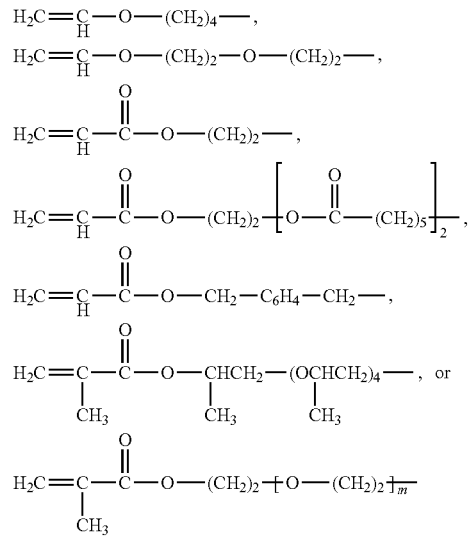

wherein m is an integer representing the number of repeating —O—$(CH_2)_2$— units, and can be, but is not limited to, from about 1 to about 10.

In specific embodiments, $R_2$ and $R_2'$ are both alkylene groups, which can be linear or branched, saturated or unsaturated, cyclic or acyclic, and substituted alkylene groups, and hetero atoms may optionally be present in the alkylene group. In some embodiments, $R_2$ and $R_2'$ are both saturated alkylene groups. In other embodiments, $R_2$ and $R_2'$ are both unsubstituted alkylene groups. In some embodiments, $R_2$ and $R_2'$ are each groups of the formula —$C_{34}H_{56+a}$— and are branched alkylene groups which may include unsaturations and cyclic groups wherein a is an integer of 0, 1, 2, 3, 4, 5, 6, 7, 8, 9, 10, 11, or 12. In specific embodiments, $R_2$ and $R_2'$ include isomers of the formula

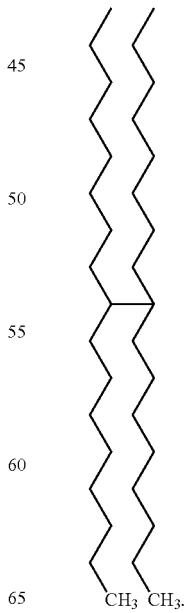

In specific embodiments, $R_3$ is a linear or branched alkylene group, which can be saturated or unsaturated, substituted or unsubstituted, and wherein hetero atoms may optionally be present in the alkylene group. In a specific embodiment, $R_3$ is an ethylene group, $-CH_2CH_2-$.
Examples of these compounds include
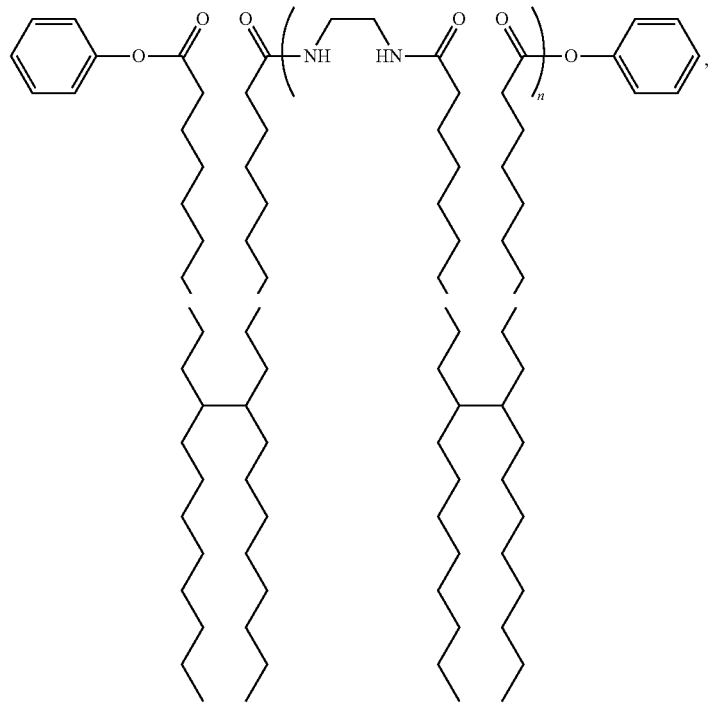
,
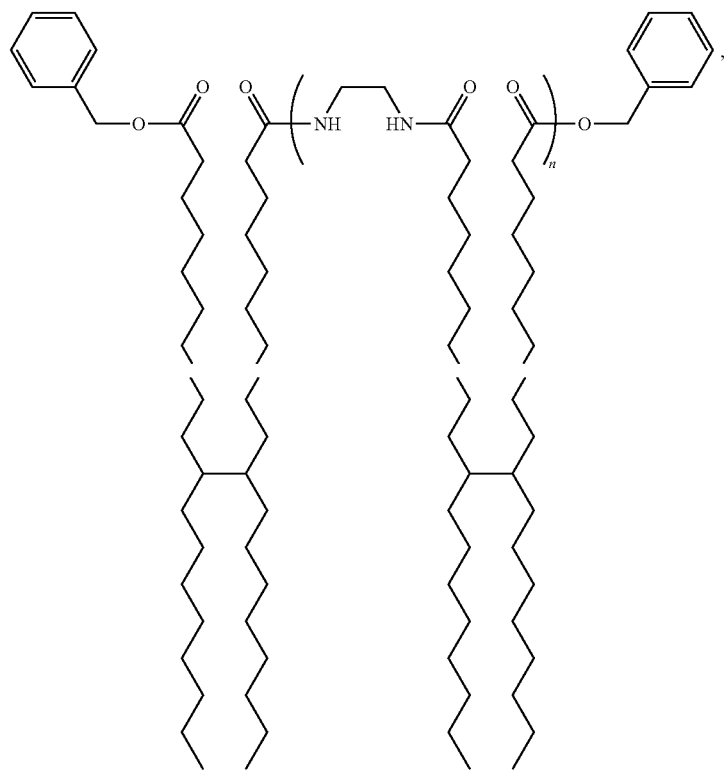
,

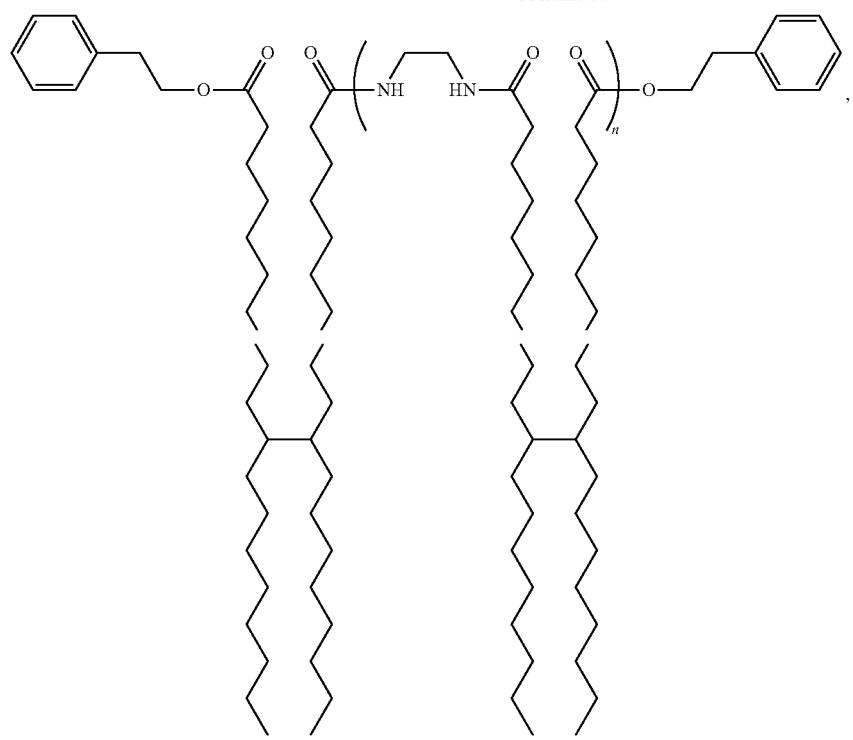
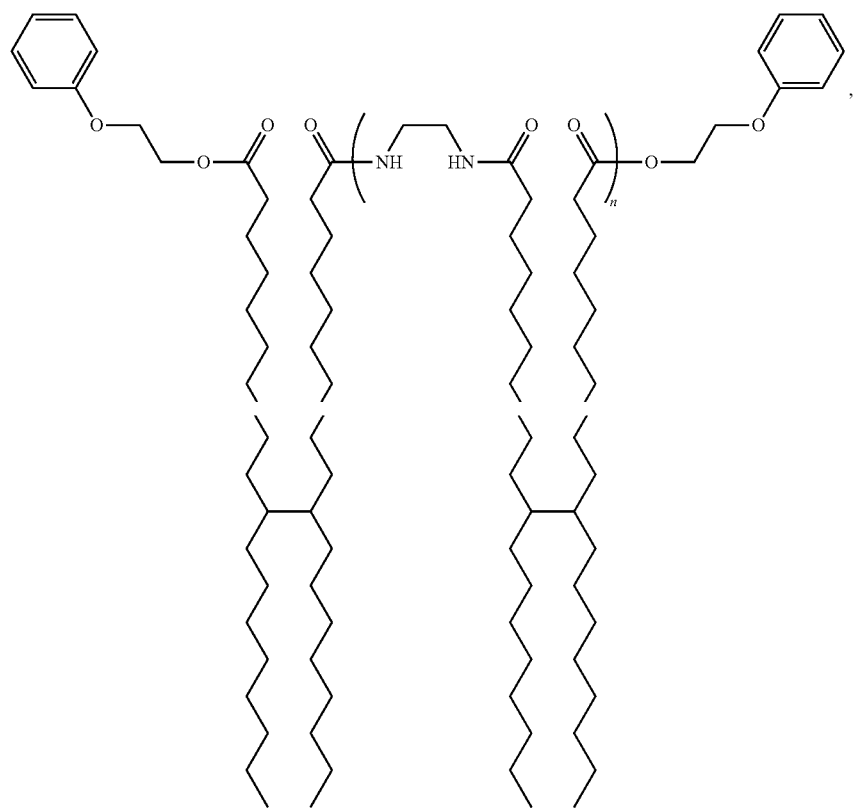

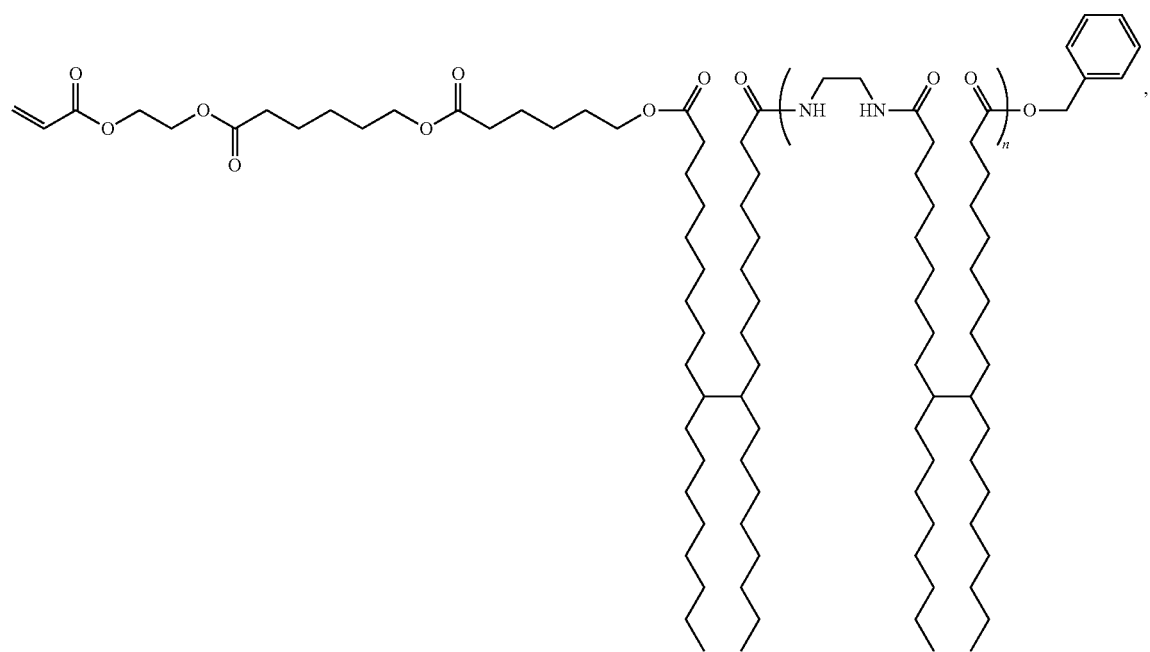
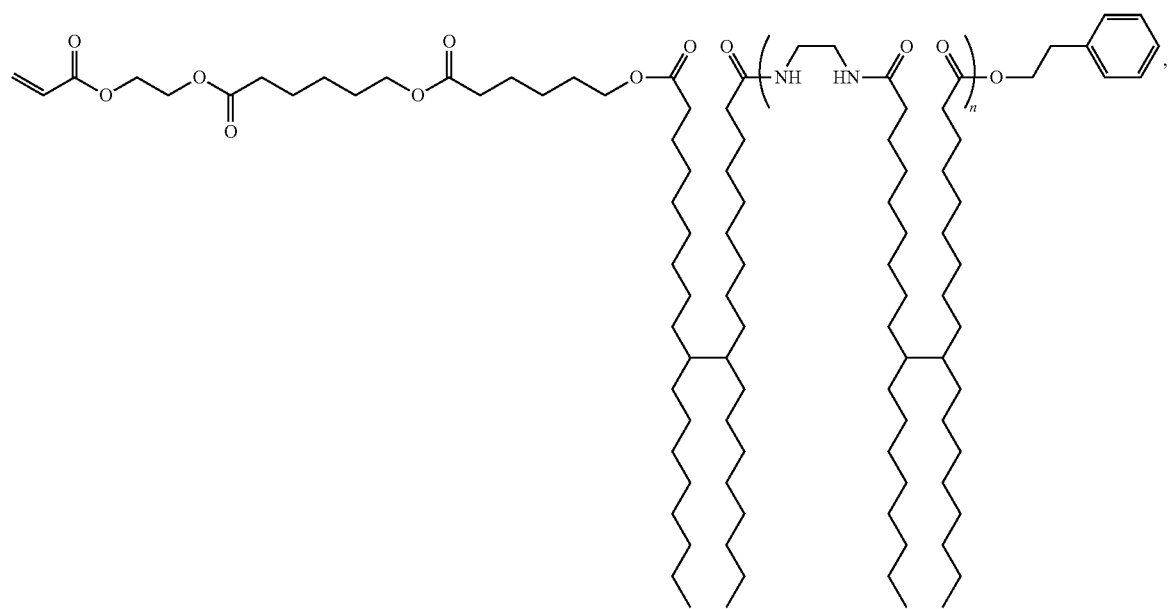

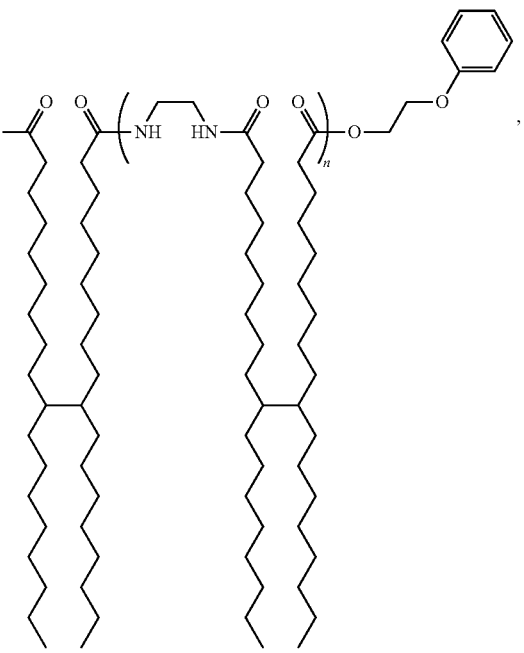

and the like, as well as mixtures thereof and the corresponding oligomers.

The compounds can be prepared as follows. In a first embodiment, about 2 molar equivalents of a diacid of the formula HOOC—$R_2$—COOH and about one molar equivalent of a diamine of the formula $H_2N$—$R_3$—$NH_2$ can be reacted under neat conditions (i.e., in the absence of a solvent) at elevated temperatures while removing water from the reaction mixture to form an acid-terminated oligoamide of the formula

HOOC—$R_2$—CONH—$R_3$—HNCO—$R_2$'COOH.

The diacid and the diamine can be present in any desired or effective relative amounts, in one embodiment, at least about 1.75 moles of diacid per every 1 mole of diamine, and in another embodiment at least about 2 moles of diacid per every 1 mole of diamine, and in one embodiment no more than about 2.5 moles of diacid per every 1 mole of diamine, in another embodiment no more than about 2.3 moles of diacid per every 1 mole of diamine, and in yet another embodiment no more than about 2.1 moles of diacid per every 1 mole of diamine, although the relative amounts can be outside of these ranges.

Water can be removed from the reaction mixture between the diacid and the diamine by any desired or effective method, such as by a Dean-Stark trap, molecular sieves or other drying agents, or the like.

The reaction between the diacid and the diamine can be carried out at any desired or effective temperature, in one embodiment at least about 90° C., in another embodiment at least about 100° C., and in yet another embodiment at least about 155° C., and one embodiment no more than about 180° C., in another embodiment no more than about 175° C., and in yet another embodiment no more than about 165° C., although the temperature can be outside of these ranges.

The reaction between the diacid and the diamine can be carried out for any desired or effective period of time, in one embodiment at least about 2 hours, in another embodiment at least about 2.5 hours, and in yet another embodiment at least about 3 hours, and in one embodiment no more than about 5 hours, in another embodiment no more than about 4.5 hours, and in another embodiment no more than about 4 hours, although the period of time can be outside of these ranges.

If desired, an antioxidant can also be included to reduce any discoloration of the resin that might occur from being subjected to high temperatures. Examples of suitable antioxidants include IRGAFOS® 168, available from BASF, or the like.

Alternatively, the acid-terminated oligoamide of the formula

HOOC—$R_2$—CONH—$R_3$—HNCO—$R_2$'—COOH can be prepared by reacting the diacid and the diamine in the presence of a coupling agent such as 1,3-dicylclohexylcarbodiimide (DCC) in the presence of a catalyst such as 4-dimethylaminopyridine (DMAP) in the presence of a solvent such as methylene chloride ($CH_2Cl_2$) at reduced temperatures followed by eventual warming to about room temperature to produce an organoamide intermediate.

Examples of suitable coupling agents include 1,3-dicyclohexylcarbodiimide (DCC), of the formula

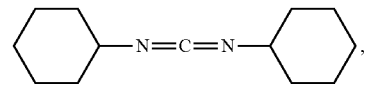 [SMILES: C(=NC1CCCCC1)=NC1CCCCC1]

1-[3-(dimethylamino)propyl]3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N',N'-bis(tetramethylene)uronium hexafluorophosphate (HBTU), bis(2-oxo-3-oxazolidinyl)phosphonic chloride (BOP-Cl), (1H-1,2,3-benzotriazol-1-yloxy)tris(pyrrolidino)phosphonium hexafluorophosphate (PyBOP), and the like, as well as mixtures thereof.

The coupling agent and the diacid can be present in any desired or effective relative amounts, in one embodiment, at least about 1.8 moles of coupling agent per every 1 mole of diacid, in another embodiment at least about 1.9 moles of coupling agent per every 1 mole of diacid, and in yet another embodiment at least about 2 moles of coupling agent per every 1 mole of diacid, and in one embodiment no more than about 2.75 moles of coupling agent per every 1 mole of diacid, in another embodiment no more than about 2.5 moles of coupling agent per every 1 mole of diacid, and in yet another embodiment no more than about 2.2 moles of coupling agent per every 1 mole of diacid, although the relative amounts can be outside of these ranges.

Examples of suitable catalysts include 4-dimethylaminopyridine (DMAP), of the formula

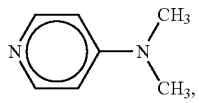

triethylamine, 1,8-diazabicyclo[5.4.0]undec-7-ene (DBU), and the like, as well as mixtures thereof.

The catalyst and the diacid are present in any desired or effective relative amounts, in one embodiment, at least about 0.05 mole of catalyst per every 1 mole of diacid, in another embodiment at least about 0.1 mole of catalyst per every 1 mole of diacid, and in yet another embodiment at least about 0.2 mole of catalyst per every 1 mole of diacid, and in one embodiment no more than about 1 mole of catalyst per every 1 mole of diacid, in another embodiment no more than about 0.8 mole of catalyst per every 1 mole of diacid, and in yet another embodiment no more than about 0.5 mole of catalyst per every 1 mole of diacid, although the relative amounts can be outside of these ranges.

Any desired or effective solvent can be employed. Examples of suitable solvents include methylene chloride, tetrahydrofuran, methyl ethyl ketone, toluene, dimethyl formamide, diethyl ether, hexane, ethyl acetate, and the like, and mixtures and combinations thereof.

The solvent can be present in any desired or effective amount, in one embodiment at least about 10 milliliters of solvent per milimole of diacid, in another embodiment at least about 15 milliliters of solvent per milimole of diacid, and in yet another embodiment at least about 20 milliliters of solvent per milimole of diacid, and in one embodiment no more than about 50 milliliters of solvent per milimole of diacid, in another embodiment no more than about 40 milliliters of solvent per milimole of diacid, and in yet another embodiment no more than about 30 milliliters of solvent per milimole of diacid, although the amount of solvent can be outside of these ranges.

In this embodiment, the reaction between the diacid, the diamine, and the coupling agent can be carried out at any desired or effective temperature, in one embodiment at least about 0° C., in another embodiment at least about 5° C., and in yet another embodiment at least about 15° C., and in one embodiment no more than about 50° C., in another embodiment no more than about 40° C., and in yet another embodiment no more than about 30° C., although the temperature can be outside of these ranges.

Thereafter, the acid-terminated oligoamide of the formula

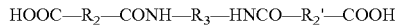

HOOC—$R_2$—CONH—$R_3$—HNCO—$R_2'$—COOH is reacted with about 2 molar equivalents of an aromatic monoalcohol of the formula $R_1$—OH in the presence of an organic tin oxide catalyst and in the absence of a solvent (neat) to produce the final product of the formula

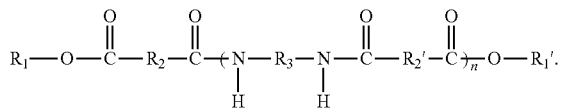

The reaction takes place in the absence of any coupling agents such as 1,3-dicyclohexylcarbodiimide or the like and in the absence of conventional catalysts other than the organotin catalyst, such as 4-dimethylaminopyridine or the like.

The acid-terminated oligoamide intermediate and the monoalcohol are present in any desired or effective relative amounts, in one embodiment at least about 2 moles of monoalcohol per every 1 mole of acid-terminated oligoamide intermediate, in another embodiment at least about 2.15 moles of monoalcohol per every 1 mole of acid-terminated oligoamide intermediate, and in yet another embodiment at least about 2.25 moles of monoalcohol per every one mole of acid-terminated oligoamide intermediate, and in one embodiment no more than about 2.75 moles of monoalcohol per every 1 mole of acid-terminated oligoamide intermediate, in another embodiment no more than about 2.5 moles of monoalcohol per every 1 mole of acid-terminated oligoamide intermediate, and in yet another embodiment no more than about 2.4 moles of monoalcohol per every 1 mole of acid-terminated oligoamide intermediate, although the relative amounts can be outside of these ranges.

Asymmetric products, in which the R groups differ from each other, can be obtained by using mixtures of alcohols as reactants, in which case one obtains a mixture of symmetrical and asymmetrical products. In addition, asymmetric products can be obtained by using protecting group chemistry and reacting a monoprotected organoamide with one alcohol, isolating the intermediate product, deprotecting, then subjecting the deprotected intermediate to reaction with the second alcohol.

The catalyst and the acid-terminated oligoamide intermediate are present in any desired or effective relative amounts, in one embodiment at least about 0.05 mole of catalyst per every 1 mole of acid-terminated oligoamide intermediate, in another embodiment at least about 0.1 mole of catalyst per every 1 mole of acid-terminated oligoamide intermediate, and in yet another embodiment at least about 0.2 mole of catalyst per every one mole of acid-terminated oligoamide intermediate, and in one embodiment no more than about 1 mole of catalyst per every 1 mole of acid-terminated oligoamide intermediate, in another embodiment no more than about 0.8 mole of catalyst per every 1 mole of acid-terminated oligoamide intermediate, and in yet another embodiment no more than about 0.5 mole of catalyst per every 1 mole of acid-terminated oligoamide intermediate, although the relative amounts can be outside of these ranges.

The catalyst is a tin, in one specific embodiment an organic tin oxide, or an organic titanate catalyst. Examples of suitable organic tin oxide catalysts include dibutyl tin oxide (($C_4H_9$)$_2$SnO), available as FASCAT® 4201, 4203, and 9201 from Arkema, Philadelphia, Pa., butylstannoic acid ($C_4H_9$SnOOH), available as FASCAT® 4100 from Arkema, butyltin tris-2-ethylhexoate ($C_{28}H_{54}O_6$Sn), available as FASCAT® 4102, dibutyltin diacetate ($C_{12}H_{24}O_4$Sn), available as FASCAT® 4200, dibutyltin dilaurate (($C_4H_9$)$_2$Sn(OOC$_{12}H_{23}$)$_2$), available as FASCAT® 4202, dibutyltin bis(2-ethylhexoate) (($C_4H_9$)$_2$Sn(OOC$_8H_{15}$)$_2$), available as FASCAT® 4208X, dibutyldichlorostannane, butyltrichlorostannane (mixture of both available as FASCAT® 4210), dibutyltin dimethoxide ($C_{16}H_{36}O_2$Sn), available as FASCAT® 4211, dibutyltin dibutoxide ($C_{16}H_{36}O_2$Sn), available as FASCAT® 4214, dibutyltin bis(1-thioglycerol) (($C_4H_9$)$_2$Sn(SCH$_2$CHOHCH$_2$OH)$_2$), available as FASCAT® 4224, monobutyltin trichloride, monobutyltin tris(2-ethylhexyl mercaptoacetate), dibutyltin bis(2-ethylhexyl mercaptoacetate) (mixture of all three available as FASCAT® 4233), triphenyltin hydroxide (($C_6H_5$)$_3$SnOH), available as FASCAT® 4351, dioctyltin bis(2-ethylhexylmercaptoacetate) (($C_8H_{15}$)$_2$Sn(SCH$_2$COOC$_8H_{17}$)$_2$, available as FASCAT® 8231, stannous bis(2-ethylhexoate), available as FASCAT® 2003, butylchlorotin dihydroxide ($C_4H_9$Sn(OH)$_2$Cl), available as FASCAT® 4101, and the like, as well as mixtures thereof. Examples of other suitable tin catalysts include tin oxide (SnO), available as FASCAT® 2000, stannous oxalate (SnC$_2$O$_4$), available as FASCAT® 2001, stannous chloride (SnCl$_2$), available as FASCAT® 2004, tin tetrachloride (SnCl$_4$), available as FASCAT® 4400, and the like, as well as mixtures thereof. Examples of suitable organic titanate catalysts include, but are not limited to, tetra-n-butyl titanate (Ti(OCH$_2$CH$_2$CH$_2$CH$_3$)$_4$), available from Royce, as ZIRCHEM TNBT from Zirchem, as VERTEC TNBT from Johnson-Matthey, and as TYZOR® TnBT from Dorf Ketal; tetra isopropyl titanate, available from Royce, as VERTEC TIPT from Johnson-Matthey, and as TYZOR® TPT from Dorf Ketal; tetra-n-propyl titanate, available as TYZOR® NPT from Dorf Ketal; tetra-2-ethylhexyl titanate (Ti(OCH$_2$CH(CH$_2$CH$_3$)CH$_2$CH$_2$CH$_2$CH$_3$)$_4$), available from Zirchem as ZIRCHEM EHT, as VERTEC EHT from Johnson-Matthey, and as TYZOR® TOT from Dorf Ketal; triethanolamine titanate, available as TYZOR® TE from Dorf Ketal; tetra isononyl titanate, available as VERTEC TINT from Johnson-Matthey; butyl isopropyl titanate, available as VERTEC BIP from Johnson-Matthey; and the like, as well as mixtures thereof. Mixtures of two or more of tin-based and organic titanate catalysts can also be employed.

It is believed that the catalyst remains in the reaction product subsequent to completion of the reaction. Accordingly, the final product contains the organotin compound in an amount of in one embodiment at least about 0.01 percent by weight of the product, in another embodiment at least about 0.10 percent by weight of the product, and in yet another embodiment at least about 0.15 percent by weight of the product, and in one embodiment no more than about 0.5 percent by weight of the product, in another embodiment no more than about 0.25 percent by weight of the product, and in yet another embodiment no more than about 0.2 percent by weight of the product, although the amount can be outside of these ranges.

The reaction between the acid-terminated oligoamide intermediate and the monoalcohol can be carried out at any desired or effective temperature, in one embodiment at least about 90° C., in another embodiment at least about 120° C., and in yet another embodiment at least about 150° C., and one embodiment no more than about 250° C., in another embodiment no more than about 200° C., and in yet another embodiment no more than about 175° C., although the temperature can be outside of these ranges.

The reaction between the acid-terminated oligoamide intermediate and the monoalcohol can be carried out for any desired or effective period of time, in one embodiment at least about 1 hour in another embodiment at least about 1.5 hours, and in yet another embodiment at least about 2 hours, and in one embodiment no more than about 2 days, in another embodiment no more than about 1.5 days, and in another embodiment no more than about 1 day, although the period of time can be outside of these ranges.

Many embodiments of the compounds thus prepared can exhibit gel-like behavior when present in solutions. Examples of materials in which they can be dissolved include curable monomers such as, for example, propoxylated neopentyl glycol diacrylate, such as SR9003, commercially available from Sartomer Co. Inc. By gel-like behavior is meant that they undergo a relatively sharp increase in viscosity over a relatively narrow temperature range. In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 5° C., in another embodiment at least about 10° C., and in yet another embodiment at least about 30° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

At least some of the compounds disclosed herein are curable. "Curable" as used herein means polymerizable or chain extendable, i.e., a material that can be cured via polymerization, including (but not limited to) free radical polymerization or chain extension, cationic polymerization or chain extension, and/or in which polymerization is photoinitiated through use of a radiation sensitive photoinitiator. Radiation curable as used herein is intended to cover all forms of curing upon exposure to a radiation source, including (but not limited to) light and heat sources and including in the presence or absence of initiators. Examples of radiation curing include (but are not limited to) ultraviolet (UV) light, for example having a wavelength of from about 200 to about 400 nanometers, visible light, or the like, optionally in the presence of photoinitiators and/or sensitizers, e-beam radiation, optionally in the presence of photoinitiators, thermal curing, optionally in the presence of high temperature thermal initiators (and which are preferably largely inactive at the jetting temperature when used in phase change inks), and appropriate combinations thereof.

The oligoamide compounds formed by the process disclosed herein in some specific embodiments can have a polydispersity value (Mw/Mn) of no more than about 3, in another embodiment of no more than about 2.75, and in yet another embodiment of no more than about 2.5, although the value can be outside of these ranges. By providing oligoamide compounds with controlled molecular weight and narrow polydispersity, the process disclosed herein enables improved toughness characteristics of the resulting product.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

An organoamide precursor was prepared as follows. To a 4L kettle equipped with a heating mantle, overhead stirrer with polytetrafluoroethylene paddle, 250 mL dropping funnel, Dean-Stark trap, and reflux condenser was added PRIPOL®C36 dimer diacid (acid#196, 2 eq, 4.23mol, 2,422 g, obtained from Cognis Corporation) followed by addition of IRGAFOS®168 (0.2 wt. %, 5.1 g, 7.9 mmol, obtained from BASF). The viscous solution was heated to 90° C., purged with argon, and stirred. Thereafter, ethylene diamine (1 eq, 2.11 mol, 141.4 mL, obtained from Sigma-Aldrich) was charged into the dropping funnel and added dropwise to the kettle over 1 h. After addition was complete, the kettle was heated to 155° C. and held at this temperature for 3 h. During this time, the water condensate was collected in the Dean-Stark trap. After 3 h, the reaction product was a viscous golden syrup. The reaction was stopped and the molten product was discharged into foil pans to cool to room temperature. 2,205 g of organoamide product was isolated as a tacky, amber resin. It is believed that this product was of the formula

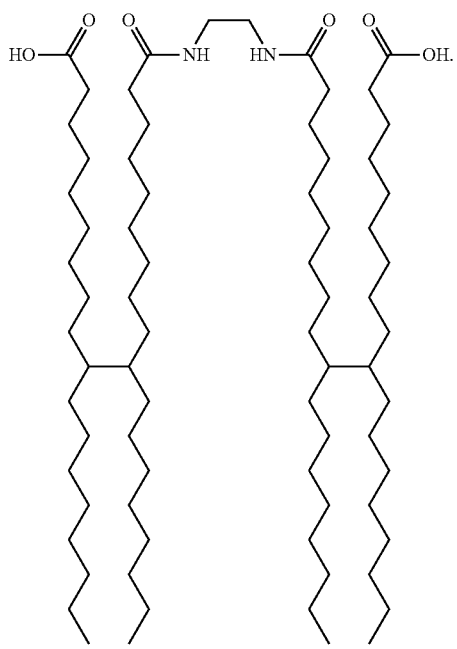 [SMILES: CCCCCCCCC(CCCCCCCCC(=O)O)C(CCCCCCCC)CCCCCCCCC(=O)NCCNC(=O)CCCCCCCCC(CCCCCCCC)C(CCCCCCCC)CCCCCCCCC(=O)O]

EXAMPLE II

In a 500 mL round-bottomed flask with an overhead stirrer having a polytetrafluoroethylene blade, Dean-Stark trap, and condenser was added 86.44 g organoamide intermediate as prepared in Example I (67.2 mmol). The material was heated to 100° C. with mixing and the vessel was purged with argon. Thereafter, to the reaction vessel was added 0.2 wt. % tris(2, 4-ditert-butylphenyl)phosphite (IRGAFOS 168 antioxidant, obtained from BASF), followed by addition of 0.1 wt. % butylstannoic acid (FASCAT® 4100, obtained from Arkema, Philadelphia, Pa.), followed by addition of phenyl glycol (16.86 mL, 134 mmol, 2 eq.). The reaction vessel was then purged with argon and heated to 170° C. in 20° C. increments over a total of 30 minutes. Thereafter the temperature was maintained at 170° C. for 2 h, followed by heating to 240° C. and maintaining at 240° C. for 4 h. During this time, water condensate evolved from the reaction and was collected in the Dean-Stark trap. Subsequently, the reaction vessel was cooled to 90° C. and the product was discharged into a pan to cool to room temperature. Total reaction time was ~4 h, with temperature ranging from 160-340° C. Gel Phase Chromatography comparison of the product to that of known material of the formula

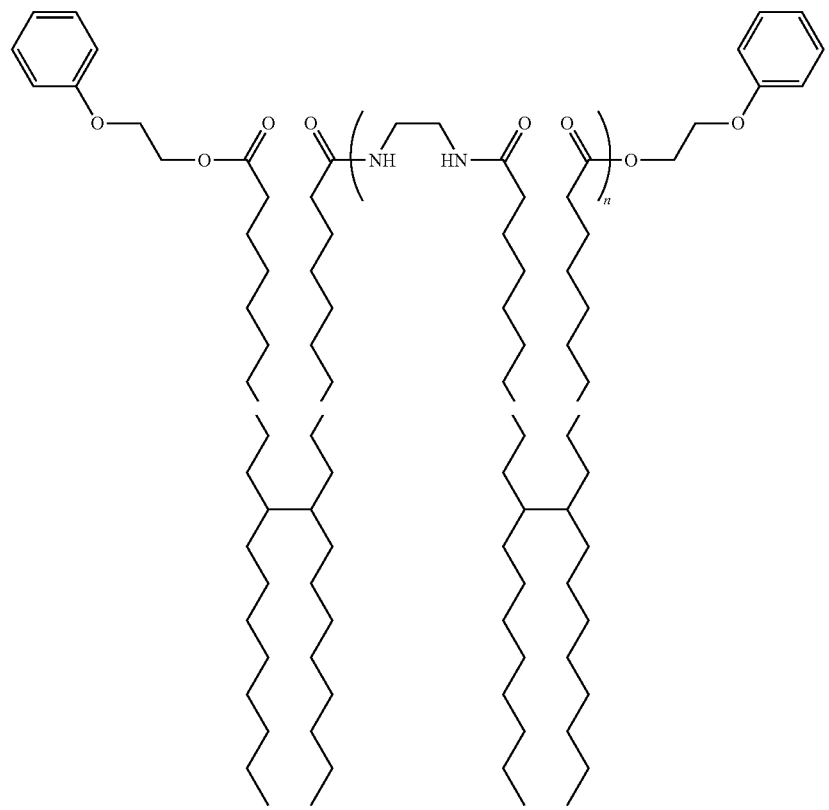

indicated a comparable molecular weight distribution profile. The materials also exhibited comparable rheologies based on a profile of complex viscosity versus temperature.

EXAMPLE III

In a 500 mL round-bottomed flask with overhead stirrer having a polytetrafluoroethylene blade, Dean-Stark trap, and condenser was added 146.53 g organoamide intermediate as prepared in Example I (114 mmol). The material was heated to 100° C. with mixing and the vessel was purged with argon. Thereafter, to the reaction vessel was added 0.2 wt. % tris(2,4-ditert-butylphenyl)phosphite (IRGAFOS 168, 0.3 g), followed by addition of 0.1 wt. % dibutyl tin oxide (FASCAT® 4201, obtained from Arkema, 0.146 g), followed by addition of phenyl glycol (28.6 mL, 228 mmol, 2 eq.). The reaction vessel was heated first to 100° C., then to 120° C., then to 150° C. The reaction mixture was then stirred for 5 h at 150° C. Finally, a vacuum was applied to drive off residual water and excess phenyl glycol for 1 h. The reaction was then stopped and the molten product was discharged into a foil pan to cool. The product, believed to be of the formula by addition of phenyl glycol (14.16 g, 103 mmol, 2 eq.). The reaction was heated to 170° C. in 10-20° C. increments and allowed to run overnight at 170° C. (ca. 18 h). After 18 h, vacuum was applied for 30 min and the water condensate byproduct was collected in the Dean-Stark trap. The kettle was cooled to <120° C., and the product was discharged into a pan to cool to room temperature. The phenyl glycol gellant product, believed to be of the same formula as that of Examples II and III, was isolated as a slightly sticky solid.

EXAMPLE V

In a 100 mL kettle with overhead stirrer, PTFE blade, Dean-Stark trap, and condenser was added 55 g of organoamide intermediate as prepared in Example I (42.7 mmol). The material was heated to 120° C. with mixing, and the vessel was purged with Ar. Thereafter, to the reaction vessel was added 0.2 wt % IRGAFOS 168 (BASF; 0.1 g), followed by 0.1 wt. % dibutyl tin oxide (FASCAT® 4201, obtained from Arkema, 0.1 g), followed by addition of phenyl glycol (11.8 g, 85.4 mmol, 2 eq.). The reaction was heated to 170° C. in 10-20° C. increments, and maintained at 174° C. for 4.5

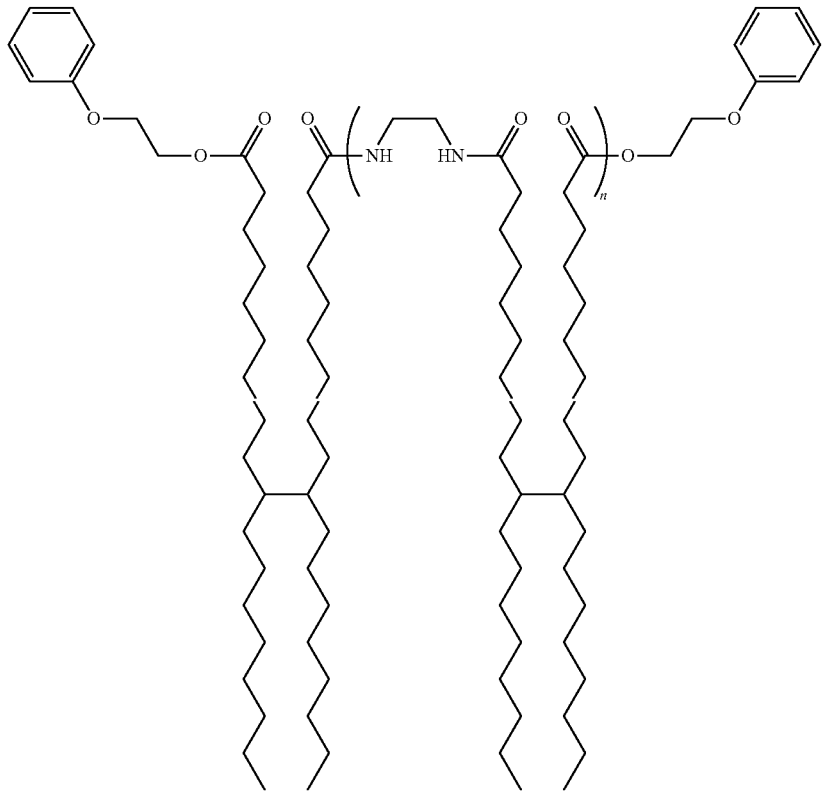

was isolated as a dark golden solid gum (151 g, 108 mmol, 95% yield).

EXAMPLE IV

In a 100 mL kettle with an overhead stirrer, PTFE blade, Dean-Stark trap, and condenser was added 65.89 g of organoamide intermediate as prepared in Example I (51.3 mmol). The material was heated to 120° C. with mixing, and the vessel was purged with Ar. Thereafter, to the reaction vessel was added 0.2 wt % IRGAFOS 168 antioxidant (BASF; 0.1 g), followed by 0.2 wt % VERTEC AC422 alkoxytitanate catalyst (obtained from Johnson-Matthey, 0.133 g), followed hours. Next, vacuum was applied for 30 min and the water condensate byproduct was collected in the Dean-Stark trap. The kettle was cooled to <120° C., and the molten product was discharged into a foil pan to cool. The phenyl glycol gellant, believed to be of the same formula as that of Examples II and III, was isolated as a slightly sticky solid. Mw=2.768×10³; Mn=1.166×10³; PDI (polydispersity index)=2.374.

EXAMPLE VI

In a 100 mL kettle with overhead stirrer, PTFE blade, Dean-Stark trap, and condenser was added 55.4 g of organoamide intermediate as prepared in Example I (43 mmol). The material was heated to 120° C. with mixing, and the vessel was purged with Ar. Thereafter, to the reaction vessel was added 0.2 wt % IRGAFOS 168 (BASF; 0.11 g), followed by 0.1 wt. % butyl stannoic acid (FASCAT® 4100, obtained from Arkema, 0.1 g), followed by addition of phenyl glycol (11.80 g, 85.4 mmol, 2 eq.). The reaction was heated to 170° C. in 10-20° C. increments, and maintained at 170-180° C. for 4 hours. Next, vacuum was applied for 30 min and the water condensate byproduct was collected in the Dean-Stark trap. The kettle was cooled to <120° C., and the molten product was discharged into a foil pan to cool. phenyl glycol gellant, believed to be of the same formula as that of Examples II and III, was isolated as a slightly sticky solid. Mw=2.854×10$^3$; Mn=1.296×10$^3$; PDI=2.202.

EXAMPLE VII

In a 100 mL kettle with overhead stirrer, PTFE blade, Dean-Stark trap, and condenser is added 55.4 g of organoamide intermediate as prepared in Example I (43 mmol). The material is heated to 120° C. with mixing, and the vessel is purged with Ar. Thereafter, to the reaction vessel is added 0.2 wt % IRGAFOS 168 (BASF; 0.11 g), followed by 0.1 wt. % butyl stannoic acid (FASCAT® 4100, available from Arkema, 0.1 g), followed by addition of a mixture of phenyl glycol (5.9 g, 42.74 mmol, 1 eq.) and dodecanol (7.96 g, 42.74 mmol, 1 eq. obtained from Sigma-Aldrich). The reaction is heated to 170° C. in 10-20° C. increments, and maintained at 170-180° C. for 4 hours. Next, vacuum is applied for 30 min and the water condensate byproduct is collected in the Dean-Stark trap. The reaction is cooled to <120° C., and the molten product is discharged into a foil pan to cool. The product is a statistical mixture of phenyl glycol capped gellant, dodecanol-capped gellant, and phenyl glycol/dodecanol capped mixed gellant.

COMPARATIVE EXAMPLE A

In a 100 mL kettle with overhead stirrer, PTFE blade, Dean-Stark trap, and condenser was added 50 g of PRIPOL®C36 dimer diacid (acid#196, obtained from Cognis Corporation, 86 mmol), 0.2 wt % IRGAFOS® 168 antioxidant (0.1 g, obtained from BASF), and 0.2 wt. % butyl stannoic acid (FASCAT® 4100, obtained from Arkema, 0.1 g). The viscous solution was heated to 90° C., purged with argon, and stirred. Thereafter, to the reaction vessel was added phenyl glycol (25.08 g, 182 mmol, 2.1 eq.), followed by the dropwise addition of ethylene diamine (3.25 mL, 48.6 mmol, 0.56 eq.; obtained from Sigma-Aldrich) via syringe over 15 minutes' time. The reaction was heated to 200° C. in 20° C. increments, and maintained at 180-200° C. overnight (ca. 18 h). After 18 h, vacuum was applied for 30 min and the water condensate byproduct was collected in the Dean-Stark trap. The kettle was cooled to <120° C., and the molten product was discharged into a foil pan to cool. The phenyl glycol gellant, believed to be of the same formula as that of Examples II and III, was isolated as a slightly sticky solid. Mw=2.781×10$^3$; Mn=0.68×10$^3$; PDI=4.09.

COMPARATIVE EXAMPLE B

In a 100 mL kettle with overhead stirrer, PTFE blade, Dean-Stark trap, and condenser was added 50 g of PRIPOL®C36 dimer diacid (acid#196, obtained from Cognis Corporation, 86 mmol), 0.2 wt % IRGAFOS®168 antioxidant (0.1 g, obtained from BASF), and 0.2 wt. % dibutyl tin oxide (FASCAT® 4201, obtained from Arkema, 0.1 g). The viscous solution was heated to 90° C., purged with argon, and stirred. Thereafter, to the reaction vessel was added phenyl glycol (25.08 g, 182 mmol, 2.1 eq.), followed by the dropwise addition of ethylene diamine (3.25 mL, 48.6 mmol, 0.56 eq. obtained from Sigma-Aldrich) via syringe over 15 minutes' time. The reaction was heated to 180° C. in 20° C. increments, and maintained at 150-180° C. overnight (ca. 18 h). After 18 h, vacuum was applied for 30 min and the water condensate byproduct was collected in the Dean-Stark trap. The kettle was cooled to <120° C., and the molten product was discharged into a foil pan to cool. The phenyl glycol gellant, believed to be of the same formula as that of Examples II and III, was isolated as a slightly sticky solid. Mw=2.427×10$^3$; Mn=0.598×10$^3$; PDI=4.06.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:
1. A process for preparing a compound of the formula

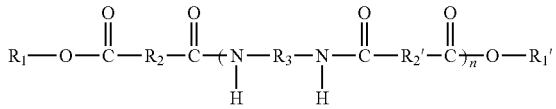

wherein;
(a) $R_1$ and $R_1'$ can be either the same as each other or different from each other, wherein $R_1$ and $R_1'$ are;
 (i) alkyl groups, including substituted and unsubstituted alkyl groups, wherein hetero atoms may optionally be present in the alkyl group;
 (ii) aryl groups, including substituted and unsubstituted aryl groups, wherein hetero atoms may optionally be present in the aryl group;
 (iii) arylalkyl groups, including substituted and unsubstituted arylalkyl groups, wherein hetero atoms may optionally be present in either the aryl or the alkyl of the arylalkyl group; or
 (iv) alkylaryl groups, including substituted and unsubstituted alkylaryl groups, wherein hetero atoms may optionally be present in either the aryl or the alkyl portion of the alkylaryl group;
provided that;
 (A) at least one of $R_1$ and $R_1'$ contains an aromatic group; and
 (B) neither of $R_1$ and $R_1'$ contains a photoinitiator group;
(b) $R_2$ and $R_2'$ can be either the same as each other or different from each other, wherein $R_2$ and $R_2'$ are each, independently of the other, are:
 (i) alkylene groups, including substituted and unsubstituted alkylene groups, and wherein hetero atoms may optionally be present in the alkylene group;
 (ii) arylene grups, including substituted and unsubstituted arylene groups, and wherein hetero atoms may optionally be present in the arylene group;
 (iii) arylalkylene groups, including substituted and unsubstituted arylalkylene groups, wherein hetero atoms may optionally be present in either the aryl or the alkyl portion of the arylalkyiene group; or
 (iv) alkylarylene groups, including substituted or unsubstituted alkylarylene groups, wherein hetero atoms may optionally be present in either the aryl or the alkyl portion of the alkylarylene group;
(c) $R_3$ is:
 (i) an alkylene group, substituted and unsubstituted alkylene groups, wherein hetero atoms may optionally be present in the alkylene group;

(ii) an arylene group, including substituted and unsubstituted arylene groups, wherein hetero atoms may optionally be present in the arylene group;

(iii) an arylalkylene group, including substituted or unsubstituted arylalkylene groups, wherein hetero atoms may optionally be present in either the aryl or the alkyl portion of the arylalkylene group; or (iv) an alkylarylene group, including substituted and unsubstituted alkylarylene groups, wherein hetero atoms may optionally be present in either the aryl or the alkyl portion of the alkylarylene group; and (d) n represents the number of repeat monomer units;

said process comprising:

(I) reacting a diacid of the formula HOOC—$R_2$—COOH with a diamine of the formula $H_2N$—$R_3$—$NH_2$ to form an acid-terminated oligoamide intermediate of the formula HOOC—$R_2$—CONH—$R_3$—HNCO—$R_2'$—COOH; and (II) reacting the acid-terminated oligoamide intermediate with a monoalcohol of the formula $R_1$—OH
(a) in the presence of a catalyst which is either
(i) a tin catalyst, or
(ii) an organic titanate catalyst,
(b) in the absence of a coupling agent, and
(c) in the absence of a solvent to form the product;

wherein the compound thus prepared has a polydispersity of no more than about 3.

2. A process according to claim 1 wherein the reaction of the diacid with the diamine to form the acid-terminated oligoamide intermediate takes place in the absence of a solvent.

3. A process according to claim 1 wherein the catalyst is dibutyl tin oxide, butylstannoic acid, butyltin tris-2-ethylhexoate, dibutyltin diacetate, dibutyltin dilaurate, dibutyltin bis(2-ethylhexoate), dibutyldichlorostannane, butyltrichlorostannane, dibutyltin dimethoxide, dibutyltin dibutoxide, dibutyltin bis(1-thioglycerol), monobutyltin trichloride, monobutyltin tris(2-ethylhexyl mercaptoacetate), dibutyltin bis (2-ethylhexyl mercaptoacetate), triphenyltin hydroxide, dioctyltin bis(2-ethylhexyl-mercaptoacetate), stannous bis (2-ethylhexoate), tin oxide, stannous oxalate, stannous chloride, tin tetrachloride, butylchlorotin dihydroxide, tetra-n-butyl titanate, tetra isopropyl titanate, tetra-n-propyl titanate, tetra-2-ethylhexyl titanate, triethanolamine titanate, tetra isononyl titanate, or a mixture thereof.

4. A process according to claim 1 wherein the reaction of the acid-terminated oligoamide intermediate with the monoalcohol is in the absence of any catalysts other than the tin or organic titanate catalyst.

5. A process according to claim 1 wherein the acid-terminated oligoamide intermediate and the monoalcohol are present in relative amounts of from about 2 moles of monoalcohol per every 1 mole of acid-terminated oligoamide intermediate to about 2.75 moles of monoalcohol per every 1 mole of acid-terminated oligoamide intermediate.

6. A process according to claim 1 wherein the organotin catalyst and the acid-terminated oligoamide intermediate are present in relative amounts of from about 0.05 mole of catalyst per every 1 mole of acid-terminated oligoamide intermediate to about 1 mole of catalyst per every 1 mole of acid-terminated oligoamide intermediate.

7. A process according to claim 1 wherein the reaction of the acid-terminated oligoamide intermediate with the monoalcohol is carried out at a temperature of from about 90 to about 250° C.

8. A process according to claim 1 wherein $R_1$ and $R_1'$ are the same as each other and wherein $R_2$ and $R_2'$ are the same as each other.

9. A process for preparing a compound of the formula

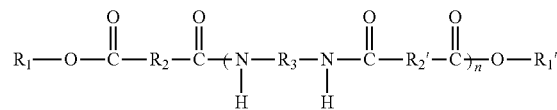

wherein
(a) R1 and R1' can be either the same as each other or different from each other, wherein R1 and R1' are each, independently of the other, are

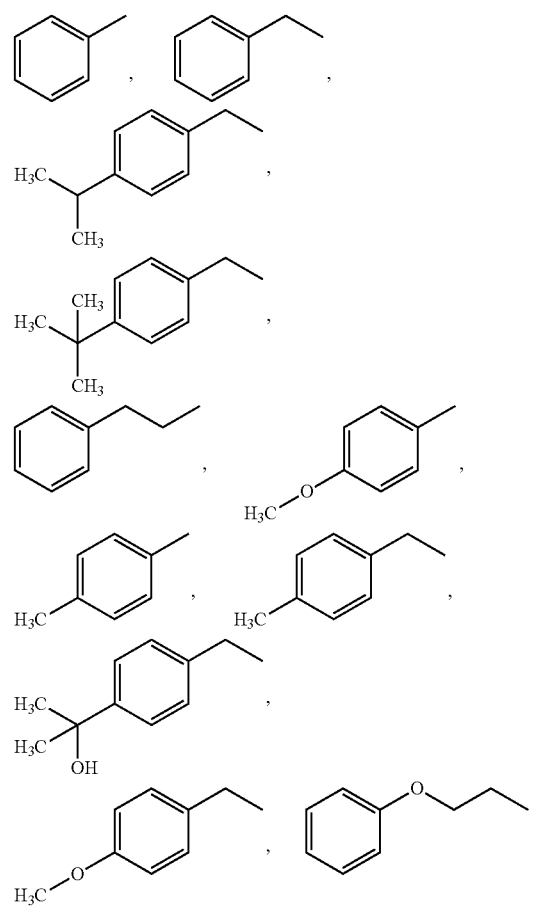

(b) R2 and R2' can be either the same as each other or different from each other, wherein R2 and R2' are each, independently of the other, are (I) alkylene groups, including substituted and unsubstituted alkylene groups, and wherein hetero atoms may optionally be present in the alkylene group;

(II) arylene groups, including substituted and unsubstituted arylene groups, and wherein hetero atoms may optionally be present in the arylene group;

(III) arylalkylene groups, including substituted and unsubstituted arylalkylene groups, wherein hetero atoms may optionally be present in either the aryl or the alkyl portion of the arylalkylene group; or (IV) alkylarylene groups, including substituted or unsubstituted alkylarylene groups, wherein hetero atoms may optionally be present in either the aryl or the alkyl portion of the alkylarylene group;

(c) R3 is:
(I) an alkylene group, substituted and unsubstituted alkylene groups, wherein hetero atoms may optionally be present in the alkylene group;
(II) an arylene group, including substituted and unsubstituted arylene groups, wherein hetero atoms may optionally be present in the arylene group;
(III) an arylalkylene group, including substituted or unsubstituted arylalkylene groups, wherein hetero atoms may optionally be present in either the aryl or the alkyl portion of the arylalkylene group; or
(IV) an alkylarylene group, including substituted and unsubstituted alkylarylene groups, wherein hetero atoms may optionally be present in either the aryl or the alkyl portion of the alkylarylene group; and (d) n represents the number of repeat monomer units; said process comprising:
(I) reacting a diacid of the formula HOOC—R2-COOH with a diamine of the formula H2N—R3-NH2 to form an acid-terminated oligoamide intermediate of the formula HOOC—R2-CONH—R3-HNCO—R2'-COOH; and
(II) reacting the acid-terminated oligoamide intermediate with a monoalcohol of the formula R1-OH
a) in the presence of a catalyst which is either
(i) a tin catalyst, or
(ii) an organic titanate catalyst,
(b) in the absence of a coupling agent, and
(c) in the absence of a solvent to form the product.

10. A process according to claim 1 wherein $R_1$ and $R_1'$ are different from each other and wherein $R_2$ and $R_2'$ are the same as each other.

11. A process according to claim 1 wherein one of $R_1$ and $R_1'$ is of the formula

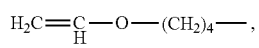

-continued

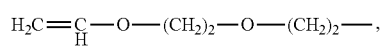

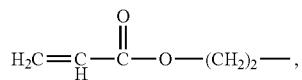

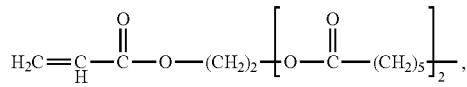

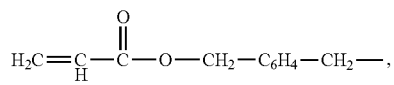

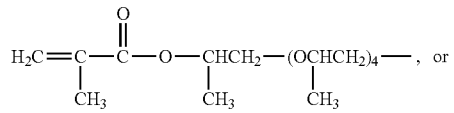

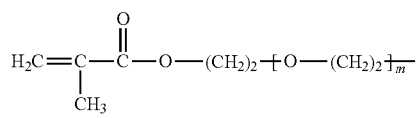

wherein m is an integer representing the number of repeating —O—$(CH_2)_2$-units.

12. A process according to claim 1 wherein $R_2$ and $R_2'$ are each branched alkylene groups of the formula —$C_{34}H_{56+a}$—, which may include unsaturations and cyclic groups, wherein a is an integer of 0, 1, 2, 3, 4, 5, 6, 7, 8, 9, 10, 11, or 12.

13. A process according to claim 1 wherein $R_3$ is —$CH_2CH_2$—.

14. A process according to claim 1 wherein the product is of the formula

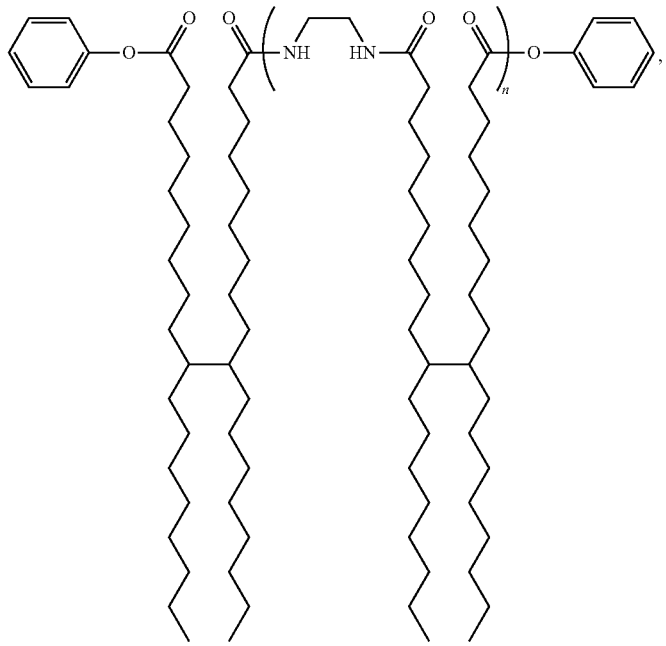

-continued
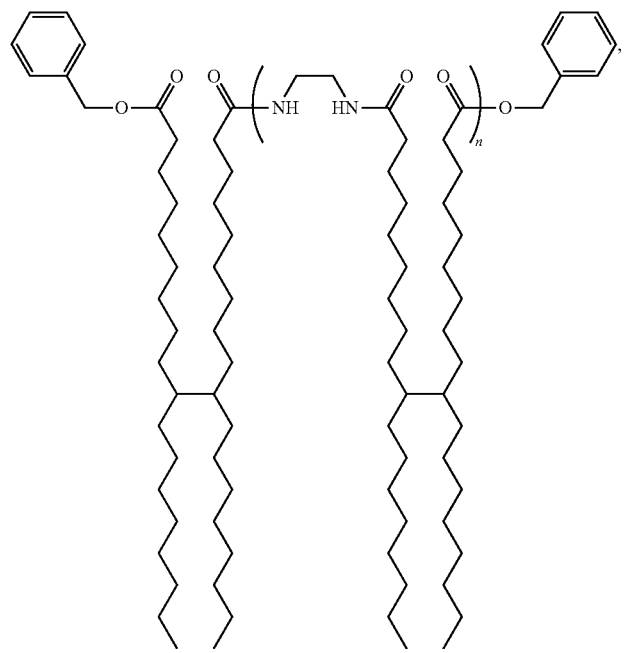
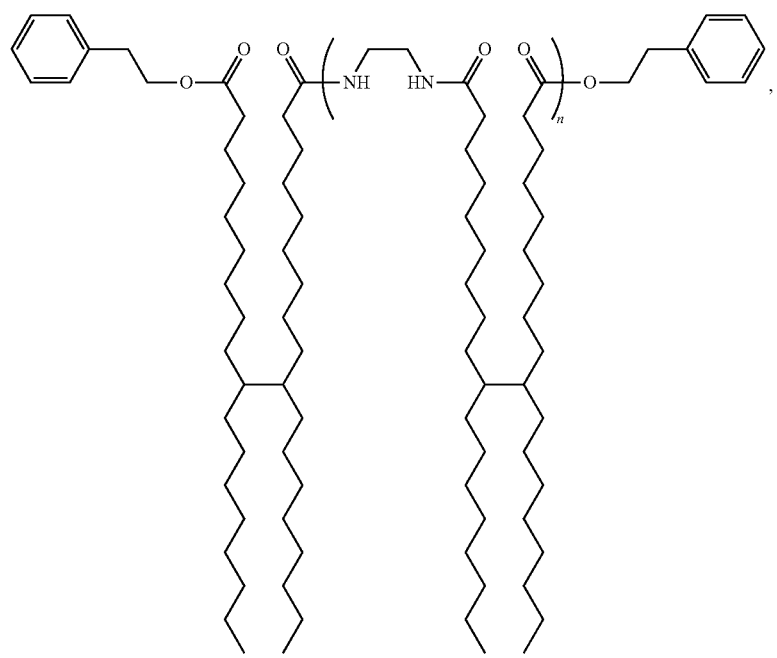

-continued
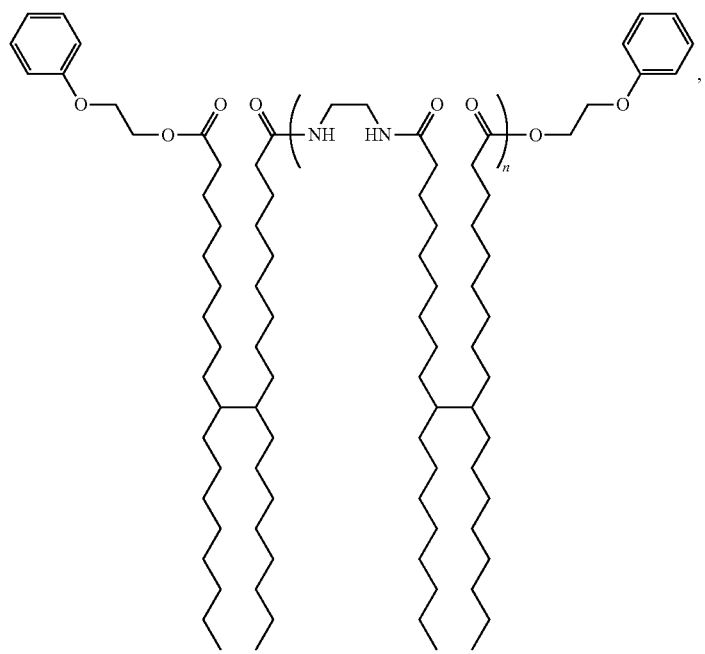
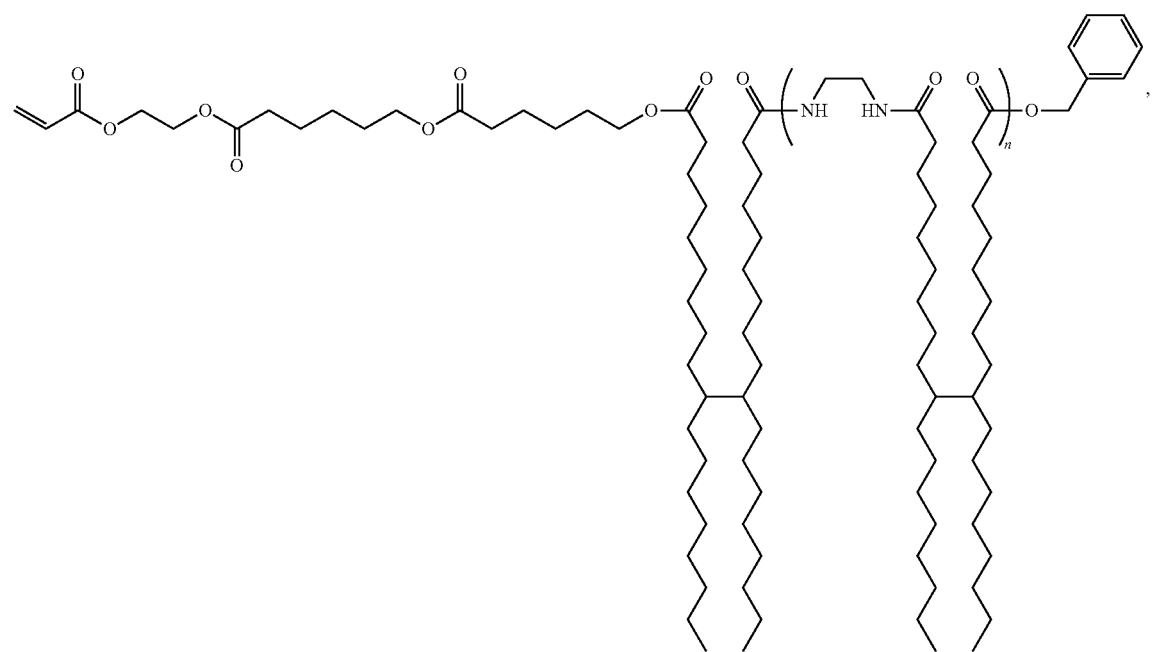

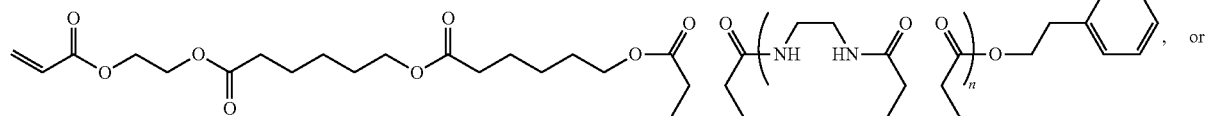
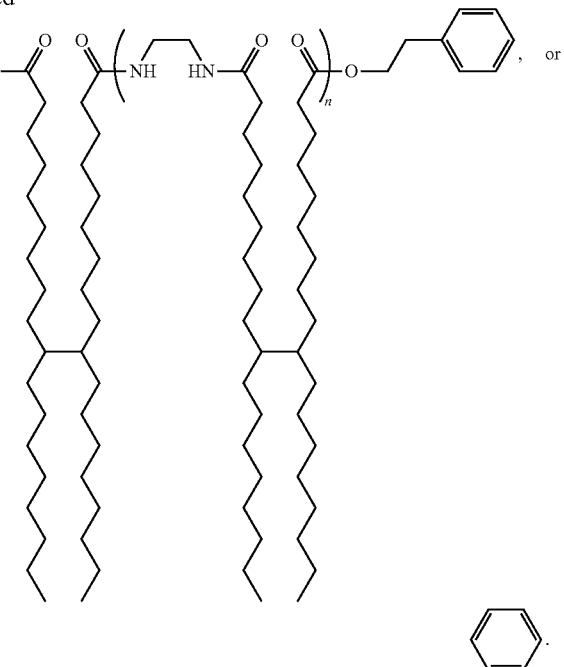
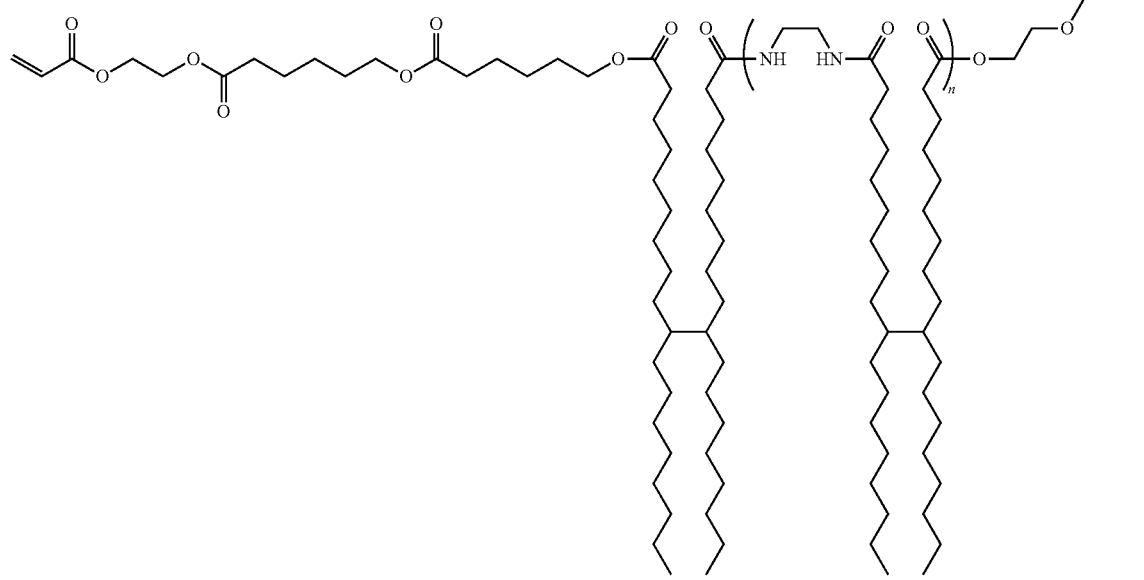
15. A process for preparing a compound of the formula
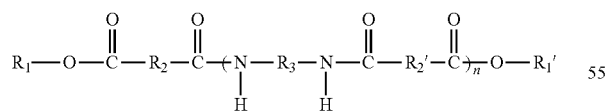
wherein:
(a) $R_1$ and $R_1'$ can be either the same as each other or different from each other, wherein $R_1$ is:
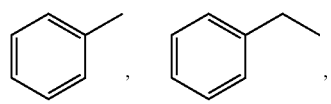
-continued
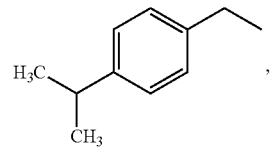
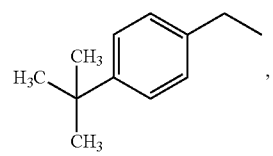

-continued

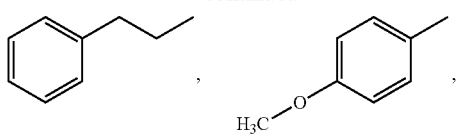,

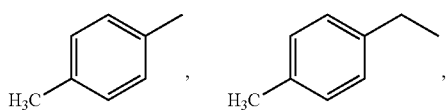,

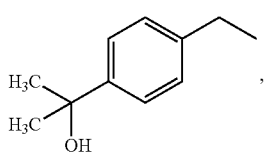,

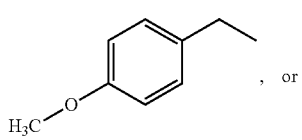, or

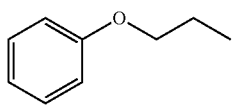

and R$_1$' is either the same as R$_1$ or is:

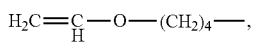,

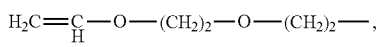,

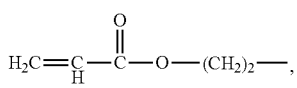,

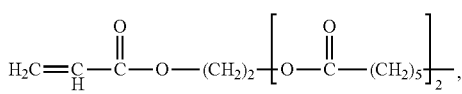,

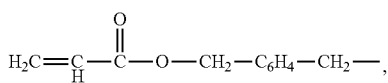,

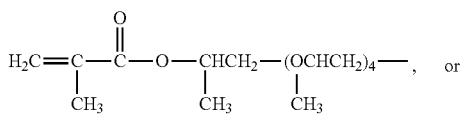, or

-continued

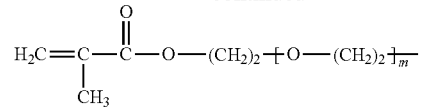

wherein m is an integer representing the number of repeating —O—(CH$_2$)$_2$—units;

(b) R$_2$ and R$_2$' are the same as each other and are each branched alkylene groups of the formula —C$_{34}$H$_{56+a}$—, which may include unsaturations and cyclic groups, wherein a is an integer of 0, 1, 2, 3, 4, 5, 6, 7, 8, 9, 10, 11, or 12;

(c) R$_3$ is —CH$_2$CH$_2$—; and (d) n represents the number of repeat monomer units and is from 1 to about 5;

said process comprising:

(I) reacting a diacid of the formula HOOC—R$_2$—COOH with a diamine of the formula H$_2$N—R$_3$—NH$_2$ in the absence of a solvent to form an acid-terminated oligoamide intermediate of the formula HOOC—R$_2$—CONH—R$_3$—HNCO—R$_2$'—COOH; and (II) reacting the acid-terminated oligoamide intermediate with a monoalcohol of the formula R$_1$—OH (a) in the presence of a tin or organic titanate catalyst which is dibutyl tin oxide, butylstannoic acid, butyltin tris-2-ethylhexoate, dibutyltin diacetate, dibutyltin dilaurate, dibutyltin bis(2-ethylhexoate), dibutyldichlorostannane, butyltrichlorostannane, dibutyltin dimethoxide, dibutyltin dibutoxide, dibutyltin bis(1-thioglycerol), monobutyltin trichloride, monobutyltin tris(2-ethylhexyl mercaptoacetate), dibutyltin bis (2-ethylhexyl mercaptoacetate), triphenyltin hydroxide, dioctyltin bis(2-ethylhexyl-mercaptoacetate), stannous bis(2-ethylhexoate), tin oxide, stannous oxalate, stannous chloride, tin tetrachloride, butylchlorotin dihydroxide, tetra-n-butyl titanate, tetra isopropyl titanate, tetra-n-propyl titanate, tetra-2-ethylhexyl titanate, triethanolamine titanate, tetra isononyl titanate, or a mixture thereof, (b) in the absence of a coupling agent, (c) in the absence of any catalysts other than the tin or organic titanate catalyst, and (d) in the absence of a solvent to form the product.

16. A process according to claim 9 wherein the catalyst is dibutyl tin oxide, butylstannoic acid, butyltin tris-2-ethylhexoate, dibutyltin diacetate, dibutyltin dilaurate, dibutyltin bis(2-ethylhexoate), dibutyldichlorostannane, butyltrichlorostannane, dibutyltin dimethoxide, dibutyltin dibutoxide, dibutyltin bis(1-thioglycerol), monobutyltin trichloride, monobutyltin tris (2-ethylhexyl mercaptoacetate), dibutyltin bis (2-ethylhexyl mercaptoacetate), triphenyltin hydroxide, dioctyltin bis(2-ethylhexyl-mercaptoacetate), stannous bis (2-ethylhexoate), tin oxide, stannous oxalate, stannous chloride, tin tetrachloride, butylchlorotin dihydroxide, tetra-n-butyl titanate, tetra isopropyl titanate, tetra-n-propyl titanate, tetra-2-ethylhexyl titanate, triethanolamine titanate, tetra isononyl titanate, or a mixture thereof.

17. A process according to claim 9 wherein the organotin catalyst and the acid-terminated oligoamide intermediate are present in relative amounts of from about 0.05 mole of catalyst per every 1 mole of acid-terminated oligoamide intermediate to about 1 mole of catalyst per every 1 mole of acid-terminated oligoamide intermediate.

18. A process according to claim 9 wherein the compound thus prepared has a polydispersity of no more than about 3.

19. A process according to claim 9 wherein the product is of the formula
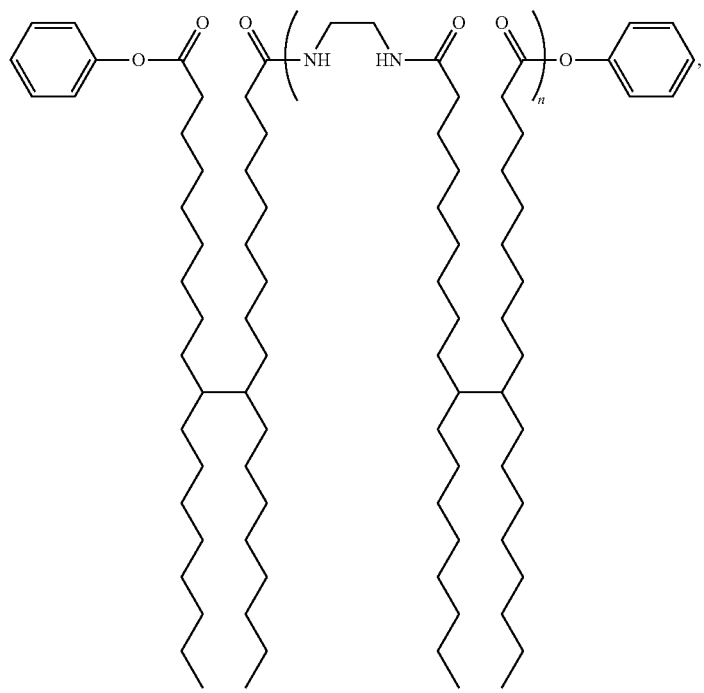
,
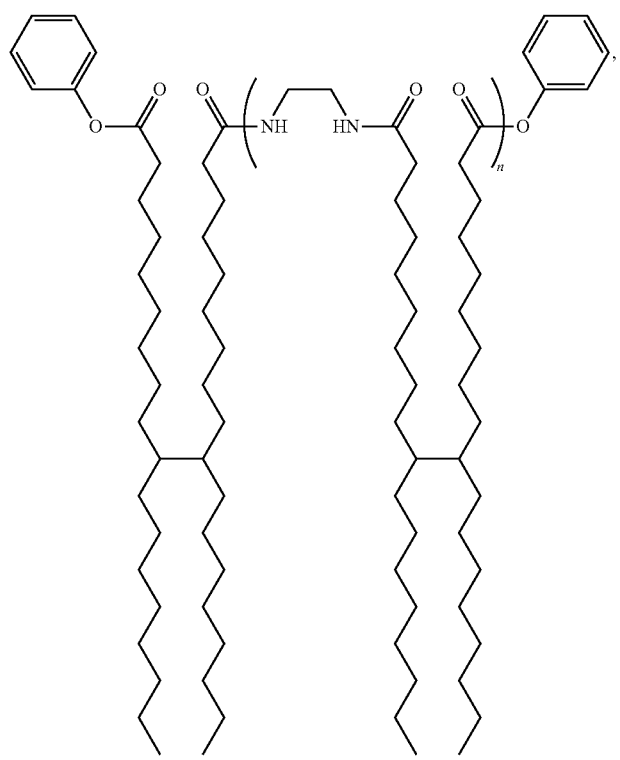
, -continued
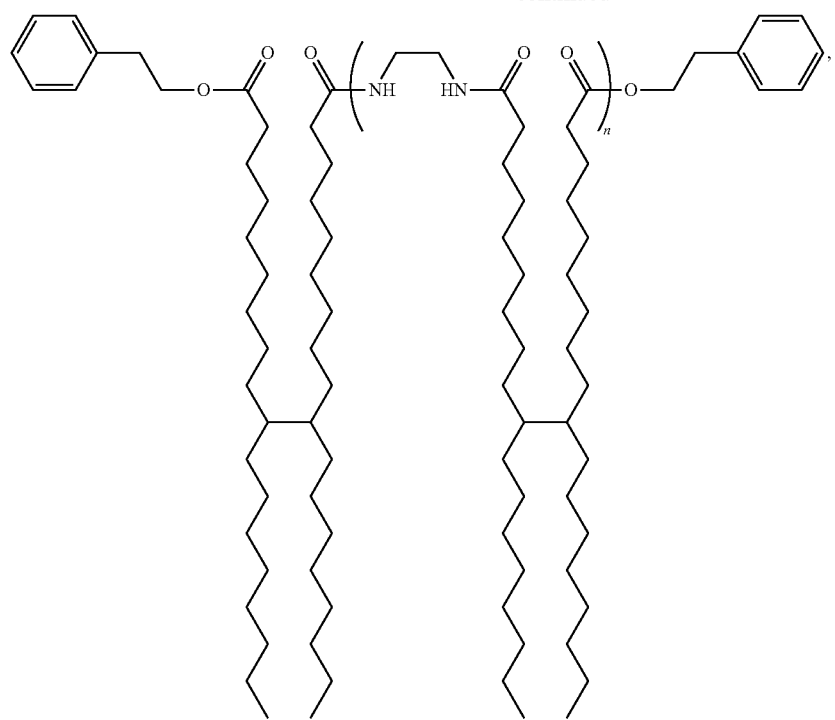
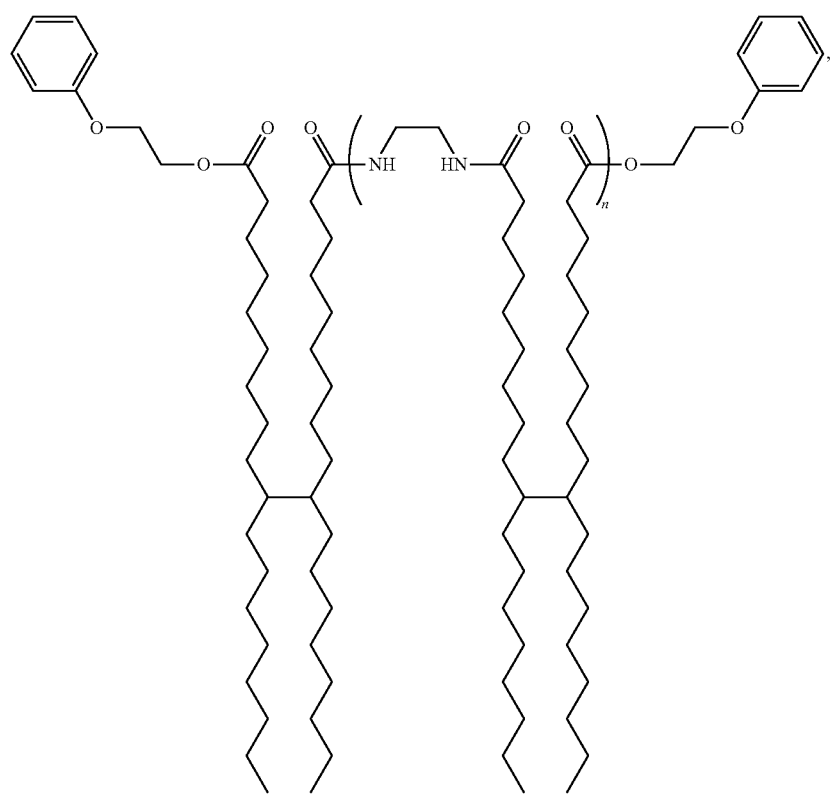

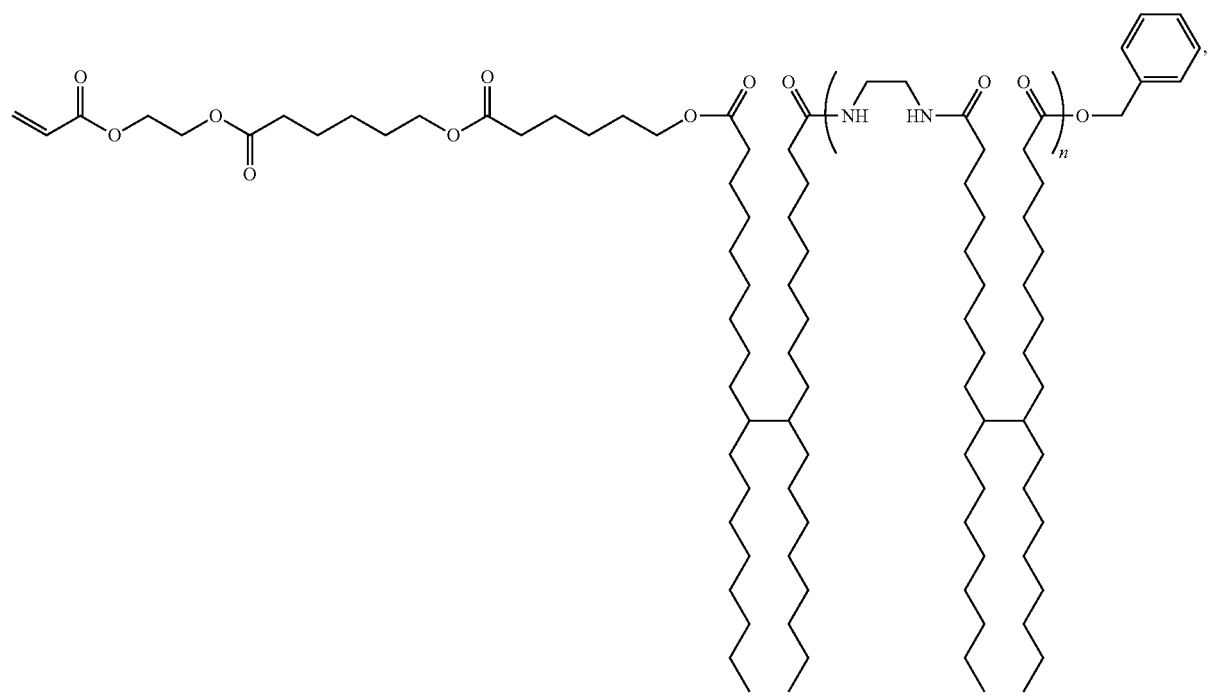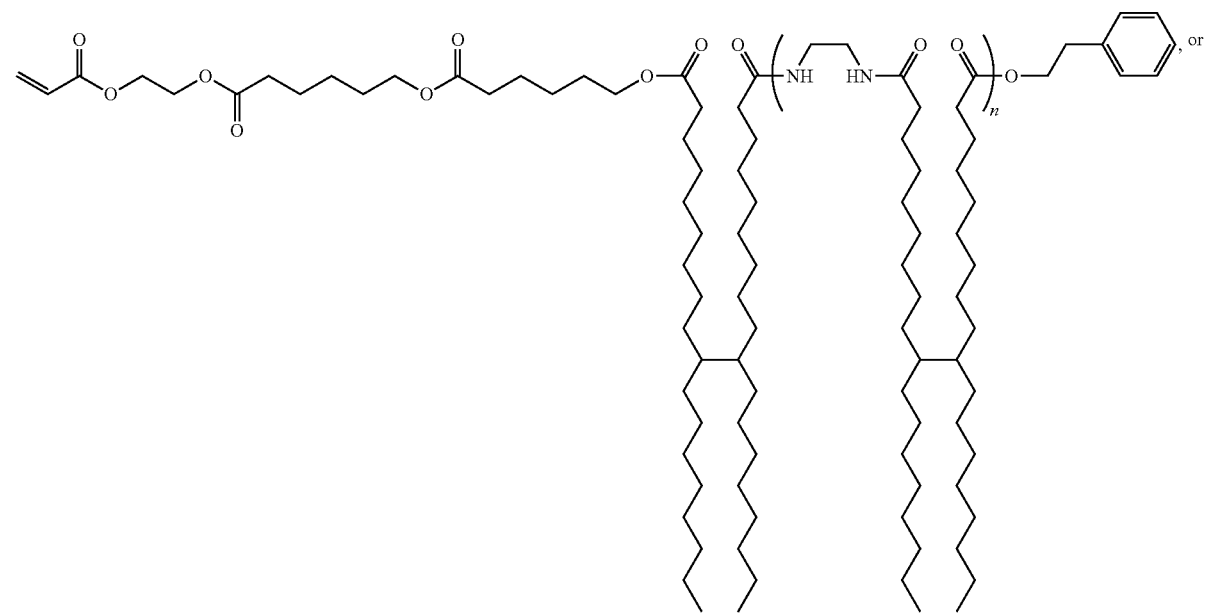

-continued
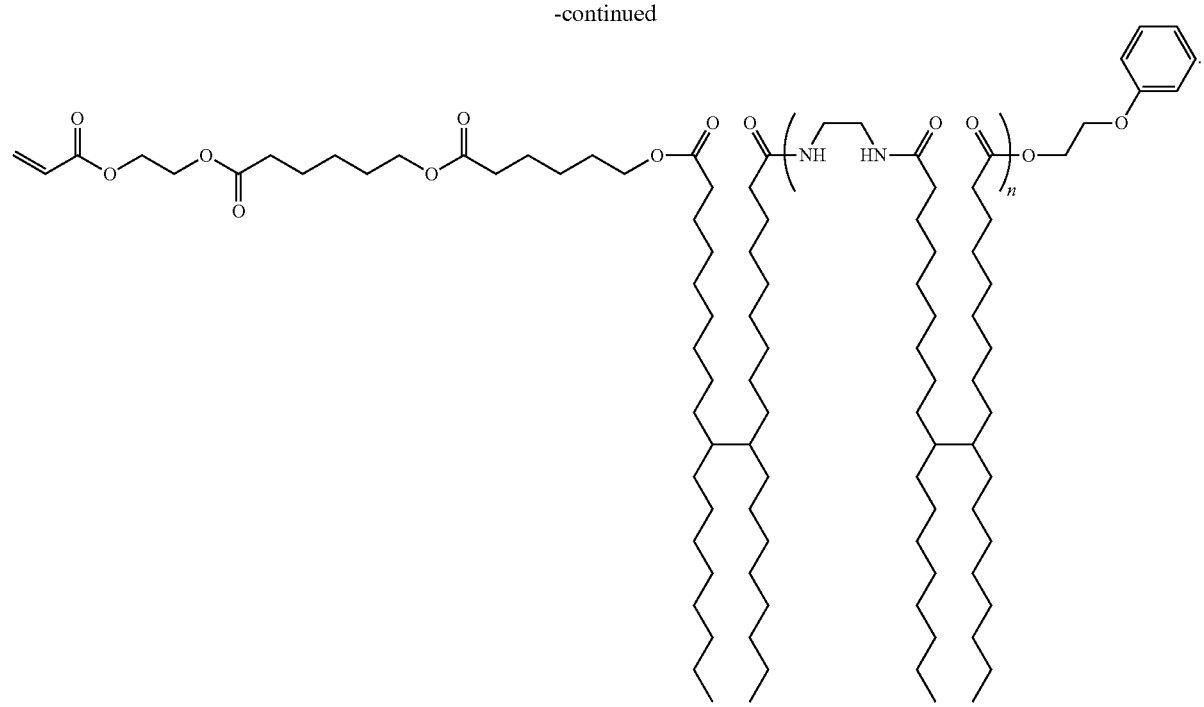
20. A process according to claim 9 wherein the reaction of the diacid with the diamine to form the acid-terminated oligoamide intermediate takes place in the absence of a solvent.
* * * * *